(12) United States Patent
Yamazaki et al.

(10) Patent No.: US 10,685,095 B2
(45) Date of Patent: Jun. 16, 2020

(54) PROCESSING EQUIPMENT AND REMOTE MANAGEMENT SYSTEM

(71) Applicants: NTT Electronics Corporation, Yokohama-shi, Kanagawa (JP); NIPPON TELEGRAPH AND TELEPHONE CORPORATION, Tokyo (JP)

(72) Inventors: Etsushi Yamazaki, Kanagawa (JP); Osamu Ishida, Kanagawa (JP); Kazuhito Takei, Kanagawa (JP); Yasuhiro Suzuki, Kanagawa (JP); Hideki Nishizawa, Kanagawa (JP)

(73) Assignees: NTT ELECTRONICS CORPORATION, Yokohama-shi, Kanagawa (JP); NIPPON TELEGRAPH AND TELEPHONE CORPORATION, Tokyo (JP)

( * ) Notice: Subject to any disclaimer, the term of this patent is extended or adjusted under 35 U.S.C. 154(b) by 22 days.

(21) Appl. No.: 15/551,691

(22) PCT Filed: Mar. 3, 2016

(86) PCT No.: PCT/JP2016/056642
§ 371 (c)(1),
(2) Date: Aug. 17, 2017

(87) PCT Pub. No.: WO2016/147892
PCT Pub. Date: Sep. 22, 2016

(65) Prior Publication Data
US 2018/0068095 A1 Mar. 8, 2018

(30) Foreign Application Priority Data

Mar. 19, 2015 (JP) ................................. 2015-055749

(51) Int. Cl.
*H04L 29/06* (2006.01)
*G06F 21/12* (2013.01)
(Continued)

(52) U.S. Cl.
CPC .............. *G06F 21/12* (2013.01); *G06F 21/10* (2013.01); *H04B 10/27* (2013.01); *H04B 10/40* (2013.01);
(Continued)

(58) Field of Classification Search
CPC .......... G06F 21/12; G06F 21/10; G06F 21/71; G06F 2221/0704; H04B 10/27; H04B 10/40; H04L 12/28; H04L 41/00
See application file for complete search history.

(56) References Cited

U.S. PATENT DOCUMENTS 9,826,060 B1 * 11/2017 Johansson ............. H04L 67/327
2002/0144125 A1 10/2002 Watanabe et al.
(Continued)

FOREIGN PATENT DOCUMENTS

CN 102737179 A 10/2012
EP 1 956 511 A2 8/2008
(Continued)

OTHER PUBLICATIONS

International Search Report for corresponding foreign application PCT/JP2016/056642 dated Jun. 7, 2016.
(Continued)

*Primary Examiner* — Ghodrat Jamshidi
(74) *Attorney, Agent, or Firm* — Myers Wolin, LLC

(57) ABSTRACT

A processing equipment includes a processing unit having a plurality of functions. A retaining unit retains a device identifier capable of identifying the processing equipment. An interface unit receives a function authentication key which is a code for setting a specific function among the
(Continued)

plurality of functions to be enabled or disabled. A control unit sets the specific function to be enabled or disabled according to the function authentication key when a device identifier included in the received function authentication key coincides with the device identifier retained in the retaining unit.

13 Claims, 21 Drawing Sheets

(51) Int. Cl.
    *H04B 10/27*      (2013.01)
    *H04L 12/28*      (2006.01)
    *G06F 21/10*      (2013.01)
    *H04L 12/24*      (2006.01)
    *H04B 10/40*      (2013.01)
    *G06F 21/71*      (2013.01)

(52) U.S. Cl.
    CPC ............. *H04L 12/28* (2013.01); *H04L 41/00* (2013.01); *G06F 21/71* (2013.01); *G06F 2221/0704* (2013.01)

(56) References Cited

U.S. PATENT DOCUMENTS

| | | | |
|---|---|---|---|
| 2003/0072448 A1* | 4/2003 | Nakamura | G06F 21/10 380/243 |
| 2004/0125397 A1* | 7/2004 | Adkins | G06F 21/10 358/1.14 |
| 2004/0158634 A1 | 8/2004 | Saito et al. | |
| 2004/0205261 A1* | 10/2004 | Osada | G06F 21/10 710/8 |
| 2005/0289072 A1* | 12/2005 | Sabharwal | G06F 21/10 705/59 |
| 2006/0015734 A1* | 1/2006 | Atobe | G06F 21/10 713/176 |
| 2006/0026105 A1* | 2/2006 | Endoh | G06F 21/10 705/59 |
| 2006/0089912 A1* | 4/2006 | Spagna | G06F 21/10 705/51 |
| 2006/0122945 A1* | 6/2006 | Ripberger | G06F 21/10 705/71 |
| 2007/0223705 A1* | 9/2007 | Kasahara | G06F 21/10 380/281 |
| 2008/0002221 A1* | 1/2008 | Fujikura | G06F 21/629 358/1.15 |
| 2008/0134319 A1* | 6/2008 | Baker | G06F 21/629 726/21 |
| 2008/0189791 A1 | 8/2008 | Yamato et al. | |
| 2008/0208754 A1* | 8/2008 | Zunke | G06F 21/10 705/59 |
| 2009/0235363 A1* | 9/2009 | Tomita | G06F 21/10 726/27 |
| 2009/0310787 A1* | 12/2009 | Nishimi | G06F 21/335 380/277 |
| 2010/0212023 A1* | 8/2010 | Asahara | G06F 21/10 726/27 |
| 2010/0250960 A1* | 9/2010 | Ogura | G06F 21/10 713/189 |
| 2010/0268955 A1 | 10/2010 | Ohno et al. | |
| 2011/0051165 A1* | 3/2011 | Yamada | G06F 3/1203 358/1.13 |
| 2011/0066721 A1* | 3/2011 | Shinomiya | G06F 21/10 709/224 |
| 2011/0162079 A1* | 6/2011 | Amimoto | G06F 21/10 726/26 |
| 2011/0176812 A1 | 7/2011 | Kamakura et al. | |
| 2011/0197077 A1* | 8/2011 | Chan | G06F 21/10 713/189 |
| 2012/0123885 A1* | 5/2012 | Shintani | G06Q 30/0251 705/21 |
| 2012/0254047 A1 | 10/2012 | Dwivedi et al. | |
| 2013/0005451 A1 | 1/2013 | Kinsley | |
| 2016/0007395 A1* | 1/2016 | Goto | H04W 84/12 370/338 |
| 2016/0048774 A1* | 2/2016 | Prickett | G06F 21/105 705/59 |

FOREIGN PATENT DOCUMENTS

| | | |
|---|---|---|
| JP | 2002-299556 A | 10/2002 |
| JP | 2004-180020 A | 6/2004 |
| JP | 2008-217773 A | 9/2008 |
| JP | 2010-218465 A | 9/2010 |
| JP | 2011-508997 A | 3/2011 |
| JP | 2011-151513 A | 8/2011 |
| JP | 2014-071695 A | 4/2014 |
| WO | WO 2009/073969 A1 | 6/2009 |
| WO | WO 2009/075181 A1 | 6/2009 |

OTHER PUBLICATIONS

Japanese Office Action for corresponding Japanese patent application No. 2015-055749 dated Apr. 19, 2016. (With Partial English Translation).
Japanese Office Action for corresponding Japanese patent application No. 2015-055749 dated Nov. 15, 2016. (with partial English translation).
Japanese Office Action for corresponding Japanese patent application No. 2016-120804 dated May 23, 2017. (with partial English translation).
Yutaka Miyamoto et al., "Ultrahigh-capacity Digital Coherent Optical Transmission Technology", NTT Technical Review, vol. 23, No. 3, pp. 13-18, Mar. 2011.
Yutaka Miyamoto et al., "Ultrahigh-capacity Digital Coherent Optical Transmission Technology", NTT Technical Review, vol. 9, No. 8, pp. 1-7, Aug. 2011.
Office Action issued in corresponding European Patent Application No. 16764722.1 dated Oct. 8, 2018.
Written Opinion for corresponding foreign application PCT/JP2016/056642 dated Sep. 28, 2017.
Office Action issued in Canadian Application 2,976,184 dated Jun. 20, 2018.
Communication pursuant to Article 94(3) EPC issued by the European Patent Office for corresponding European Patent Application No. 16 764 722.1-1218, dated May 16, 2019.
Office Action issued by the Canadian Intellectual Property Office for corresponding Canadian Patent Application No. 2,976,184, dated Apr. 11, 2019.
Communication pursuant to Article 94(3) EPC issued by the European Patent Office for corresponding European Patent Application No. 16 764 722.1-1218, dated Nov. 11, 2019.
The First Office Action issued by the State Intellectual Property Office of People's Republic of China for corresponding Chinese Patent Application No. 201680016582.X, dated Oct. 9, 2019, with full English machine translation.
Third Office Action issued by the Canadian Intellectual Property Office for corresponding Canadian Patent Application No. 2,976,184, dated Dec. 30, 2019.
Notice of Second Review Opinion issued by the China National Intellectual Property Administration for corresponding Chinese Patent Application No. 201680016582.X, dated Mar. 17, 2020, with an English translation.

* cited by examiner

FIG. 7

| INFORMATION RETAINING UNIT | | | | | | |
|---|---|---|---|---|---|---|
| DEVICE INFORMATION | | | | | | |
| (DEVICE IDENTIFIER) DSP-1 | (DEVICE STATUS INFORMATION) | | | | | |
| | IMPLEMENTED FUNCTION LIST | CD COMPENSATION | PMD COMPENSATION | DEMODULATION | | ⋯ |
| | | | | QPSK | 16QAM | |
| | FUNCTION USE STATE | ○ | ○ | ○ | ○ | ⋯ |
| | NUMBER OF TIMES OF LICENSE ISSUANCE | ○ | ○ | ○ | ○ | ⋯ |
| FUNCTION AUTHENTICATION KEY | | | | | | |

FIG. 8

INFORMATION RETAINING UNIT

DEVICE INFORMATION

| (DEVICE IDENTIFIER) DSP-1 | IMPLEMENTED FUNCTION LIST | (DEVICE STATUS INFORMATION) | | | | |
|---|---|---|---|---|---|---|
| | | CD COMPENSATION | PMD COMPENSATION | DEMODULATION | | |
| | | | | QPSK | 16QAM | ... |
| | FUNCTION USE STATE | 0 | 0 | 1 | 0 | ... |
| | NUMBER OF TIMES OF LICENSE ISSUANCE | 0 | 0 | 1 | 0 | ... |

FUNCTION AUTHENTICATION KEY

| (TARGET DEVICE IDENTIFIER) DSP-1 | (NUMBER OF TIMES OF LICENSE ISSUANCE) 0 | (TARGET FUNCTION) QPSK DEMODULATION | (SETTING FLAG) ENABLE | ... |
|---|---|---|---|---|

FIG. 9

INFORMATION RETAINING UNIT

DEVICE INFORMATION

| (DEVICE IDENTIFIER) DSP-1 | | (DEVICE STATUS INFORMATION) | | | | |
|---|---|---|---|---|---|---|
| | | CD COMPENSATION | PMD COMPENSATION | DEMODULATION | | ... |
| | | | | QPSK | 16QAM | |
| | IMPLEMENTED FUNCTION LIST | 0 | 0 | 0 | 0 | ... |
| | FUNCTION USE STATE | 0 | 0 | 2 | 0 | ... |
| | NUMBER OF TIMES OF LICENSE ISSUANCE | | | | | |

FUNCTION AUTHENTICATION KEY

| (TARGET DEVICE IDENTIFIER) DSP-1 | (NUMBER OF TIMES OF LICENSE ISSUANCE) 1 | (TARGET FUNCTION) QPSK DEMODULATION | (SETTING FLAG) DISABLE | ... |
|---|---|---|---|---|

FIG. 10

INFORMATION RETAINING UNIT

DEVICE INFORMATION

| (DEVICE IDENTIFIER) DSP-1 | IMPLEMENTED FUNCTION LIST | (DEVICE STATUS INFORMATION) | | | | |
|---|---|---|---|---|---|---|
| | | CD COMPENSATION | PMD COMPENSATION | DEMODULATION | | |
| | | | | QPSK | 16QAM | ... |
| | FUNCTION USE STATE | 0 | 0 | 1 | 0 | ... |
| | NUMBER OF TIMES OF LICENSE ISSUANCE | 0 | 0 | 3 | 0 | ... |

FUNCTION AUTHENTICATION KEY

| (TARGET DEVICE IDENTIFIER) DSP-1 | (NUMBER OF TIMES OF LICENSE ISSUANCE) 2 | (TARGET FUNCTION) QPSK DEMODULATION | (SETTING FLAG) ENABLE | ... |
|---|---|---|---|---|

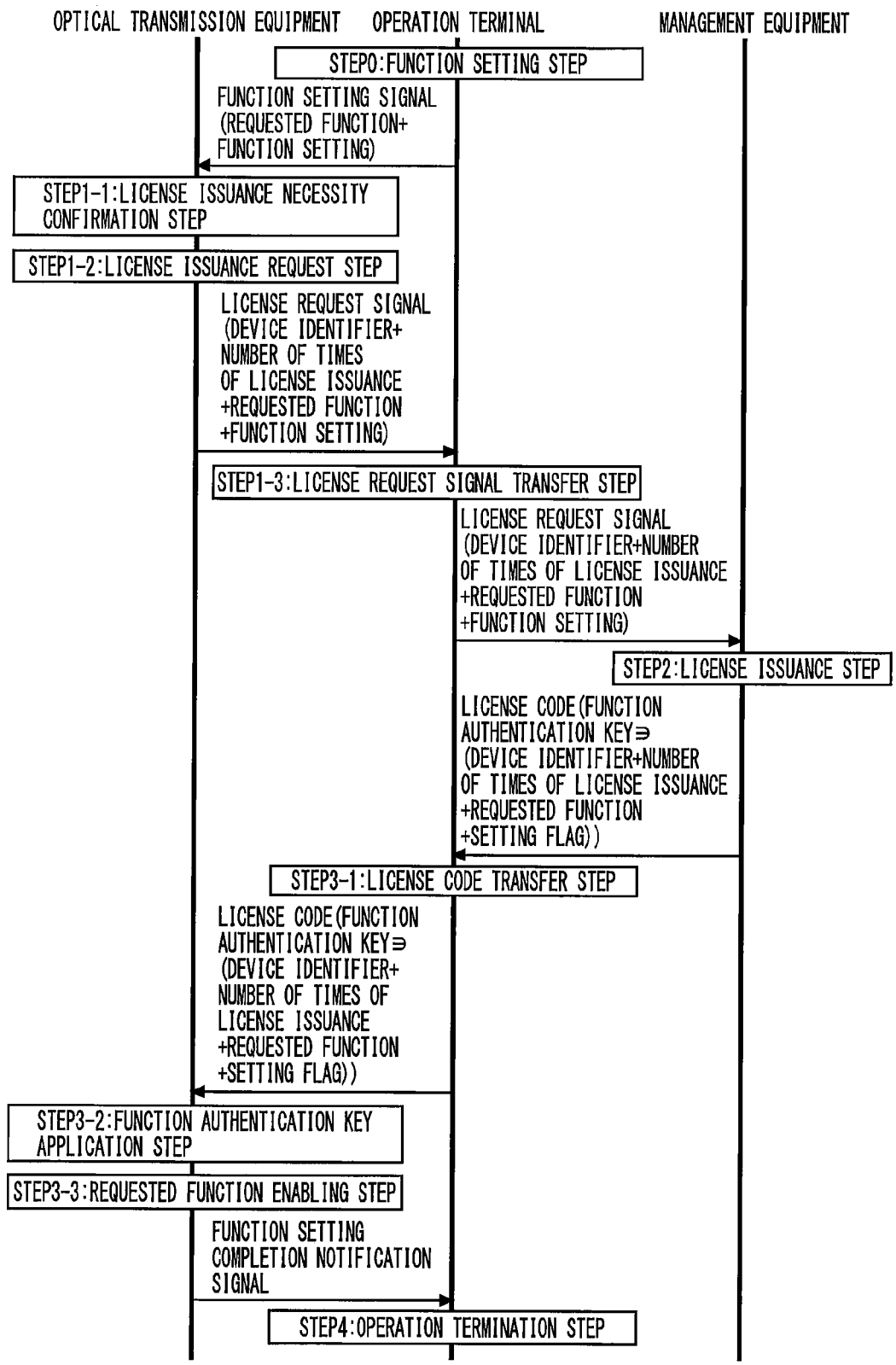

FIG. 15

| INFORMATION RETAINING UNIT | | | | | | | | |
|---|---|---|---|---|---|---|---|---|
| DEVICE INFORMATION | | | | | | | | |
| | | (DEVICE STATUS INFORMATION) | | | | | | |
| (DEVICE IDENTIFIER) DSP-1 | IMPLEMENTED FUNCTION LIST | | CD COMPENSATION | PMD COMPENSATION | QPSK DEMODULATION | DEMODULATION | | |
| | | | | | | 16QAM DEMODULATION | | ... |
| | FUNCTION USE STATE | | 0 | 0 | 1 | 0 | | ... |
| DSP-2 | FUNCTION USE STATE | | 0 | 0 | 0 | 0 | | ... |
| ... | | | | | | | | |
| DSP-n | FUNCTION USE STATE | | 0 | 0 | 0 | 0 | | ... |
| (LICENSE INFORMATION) | | | | | | | | |
| IMPLEMENTED FUNCTION LIST | | | CD COMPENSATION | PMD COMPENSATION | QPSK DEMODULATION | 16QAM DEMODULATION | | ... |
| NUMBER OF TIMES OF LICENSE ISSUANCE | | | 0 | 2 | 3 | 0 | | ... |
| LICENSE APPLICATION DESTINATION | | | (NULL) | (NULL) | DSP-1 | (NULL) | | ... |
| FUNCTION AUTHENTICATION KEY | (TARGET DEVICE IDENTIFIER) DSP-1,...DSP-n | (NUMBER OF TIMES OF LICENSE ISSUANCE) 2 | (TARGET FUNCTION) QPSK DEMODULATION | (SETTING FLAG) ENABLE | (NUMBER OF EFFECTIVE LICENSES) 2 | | | ... |
| | (TARGET DEVICE IDENTIFIER) DSP-1,...DSP-n | (NUMBER OF TIMES OF LICENSE ISSUANCE) 1 | (TARGET FUNCTION) PMD COMPENSATION | (SETTING FLAG) DISABLE | (NUMBER OF EFFECTIVE LICENSES) 0 | | | ... |

FIG. 18

(SPECIFIED FROM DEVICE INFORMATION AND FUNCTION AUTHENTICATION KEY)

| REQUESTED FUNCTION | CONTROL TARGET DIGITAL COHERENT DSP-LSI | FUNCTION USE STATE | NUMBER OF EFFECTIVE LICENSES |
|---|---|---|---|
| QPSK DEMODULATION | DSP-1 | DISABLE | 2 |
| | DSP-2 | DISABLE | |
| | DSP-3 | ENABLE | |
| | DSP-4 | ENABLE | |
| | DSP-5 | DISABLE | |

(SPECIFIED FROM FUNCTION SETTING SIGNAL)

| REQUESTED FUNCTION | SETTING TARGET DIGITAL COHERENT DSP-LSI | FUNCTION SETTING |
|---|---|---|
| QPSK DEMODULATION | DSP-1 | ENABLE |
| | DSP-2 | ENABLE |
| | DSP-3 | DISABLE |
| | — | — |
| | — | — |

OVERWRITE

| REQUESTED FUNCTION | SETTING TARGET DIGITAL COHERENT DSP-LSI | FUNCTION USE STATE |
|---|---|---|
| QPSK DEMODULATION | DSP-1 | ENABLE |
| | DSP-2 | ENABLE |
| | DSP-3 | DISABLE |
| | DSP-4 | ENABLE |
| | DSP-5 | DISABLE |

FIG. 20

(a) BEFORE PROCESSING IN STEP 3-2-3-1

| (DEVICE IDENTIFIER) | (DEVICE STATUS INFORMATION) | | (LICENSE INFORMATION) | |
|---|---|---|---|---|
| | REQUESTED FUNCTION | FUNCTION USE STATE | LICENSE APPLICATION DESTINATION | NUMBER OF TIMES OF LICENSE ISSUANCE |
| DSP-1 | | DISABLE | 0 | 2 |
| DSP-2 | | DISABLE | 0 | |
| DSP-3 | QPSK DEMODULATION | ENABLE | 1 | |
| DSP-4 | | ENABLE | 1 | |
| DSP-5 | | DISABLE | 0 | |

(b) AFTER PROCESSING IN STEP 3-2-3-1

| (DEVICE IDENTIFIER) | (DEVICE STATUS INFORMATION) | | (LICENSE INFORMATION) | |
|---|---|---|---|---|
| | REQUESTED FUNCTION | FUNCTION USE STATE | LICENSE APPLICATION DESTINATION | NUMBER OF TIMES OF LICENSE ISSUANCE |
| DSP-1 | | DISABLE | 1 | 2 |
| DSP-2 | | DISABLE | 1 | |
| DSP-3 | QPSK DEMODULATION | ENABLE | 0 | |
| DSP-4 | | ENABLE | 1 | |
| DSP-5 | | DISABLE | 0 | |

(c) AFTER PROCESSING IN STEP 3-3-4

| (DEVICE IDENTIFIER) | (DEVICE STATUS INFORMATION) | | (LICENSE INFORMATION) | |
|---|---|---|---|---|
| | REQUESTED FUNCTION | FUNCTION USE STATE | LICENSE APPLICATION DESTINATION | NUMBER OF TIMES OF LICENSE ISSUANCE |
| DSP-1 | | ENABLE | 1 | 3 |
| DSP-2 | | ENABLE | 1 | |
| DSP-3 | QPSK DEMODULATION | DISABLE | 0 | |
| DSP-4 | | ENABLE | 1 | |
| DSP-5 | | DISABLE | 0 | |

PROCESSING EQUIPMENT AND REMOTE MANAGEMENT SYSTEM

CROSS-REFERENCE TO RELATED APPLICATIONS

This application is a National Stage entry of International Application No. PCT/JP2016/056642, filed Mar. 3, 2016, which claims priority to Japanese Patent Application No. 2015-055749, filed Mar. 19, 2015. The disclosures of the priority applications are incorporated in their entirety herein by reference.

FIELD

The present invention relates to a processing equipment such as an optical transmission equipment and a remote management system that remotely manages the processing equipment.

BACKGROUND

According to the rapid spread of a broadband access for handling a large volume of data, communication traffic tends to increase year after year. Innovations in optical transmission techniques have been continuing in order to cope with the rapidly increasing communication traffic. In recent years, as a transmission technique for realizing a transmission capacity exceeding 100 Gbit/s per one wavelength, a digital coherent optical transmission technique has been developed (see, for example, NPL 1).

An optical transmission equipment using the digital coherent optical transmission technique includes a LAN interface unit that inputs and outputs a client signal of, for example, 100 GbE (Gigabit Ethernet) (Ethernet is a registered trademark), a WAN interface unit that is connected to an opposed optical transmission equipment and inputs and outputs an OTN (Optical Transport Network) signal, and a digital function unit. The digital function unit includes a client-signal processing LSI that performs termination processing of a client signal, an OTN framer LSI that transparently stores the client signal in an OTN frame, and a digital coherent DSP-LSI.

In the conventional coherent optical communication scheme, a local oscillation light source (LO) is provided in a receiver, a beat signal with a received optical signal is converted into a baseband or an intermediate frequency band, and a received equalized waveform is regenerated. This configuration enables high sensitive detection and static chromatic dispersion compensation (delay equalization) of an optical fiber, which is a transmission line, and the like. However, in the conventional coherent optical communication system, synchronization of frequencies/phases between a transmitted optical signal and a local oscillation light, polarization tracking, and the like have been significant technical problems. In the digital coherent optical transmission technique, such processing is realized by digital signal processing using a digital coherent DSP-LSI. Besides such processing, the digital coherent DSP-LSI performs CD (chromatic dispersion) compensation and PMD (polarization mode dispersion) compensation by a digital filter, demodulation processing of a modulated signal such as QPSK (Quadrature Phase Shift Keying) and QAM (Quadrature Amplitude Modulation), FEC (forward error correction) processing, and the like. In this way, in the digital coherent DSP-LSI, various functions necessary for performing coherent detection of a received optical signal are implemented.

CITATION LIST

Non Patent Literature

[NPL 1] Hiroshi Miyamoto, Akihide Sano, Eiji Yoshida, Toshikazu Banno, "Ultra-large Capacity Digital Coherent Optical Transmission Technology", NTT Technical Journal, Vol. 23, No. 3, pp. 13 to 18 (March 2011)

SUMMARY

Technical Problem

A customer who uses an optical transmission equipment needs not all of functions implemented in the optical transmission equipment. For example, a customer A connects an opposed optical transmission equipment in a relatively long distance and makes the optical transmission equipment transmit a signal at speed of 100 Gbit/s. In this case, the customer A desires to use 16 QAM as a modulation and demodulation format and use an EFEC (Enhanced FEC) function, which is a stronger error correction function. On the other hand, a customer B connects an opposed optical transmission equipment in a relatively short distance and makes the optical transmission equipment transmit a signal at speed of 10 Gbit/s. On this case, the customer B only has to use QPSK as a modulation and demodulation format and use a normal FEC function. When a distance between two pieces of equipment is short, a chromatic dispersion compensation function is unnecessary.

To meet various demands of customers to the optical transmission equipment, a manufacturer of the digital coherent DSP-LSI needs to prepare a variety of product lineups corresponding to tastes of the customers. A manufacturer and a distributor of the optical transmission equipment need to manufacture and supply optical transmission equipments with functions customized according to respective customers. Completion of product lineups meeting the demands of the customers is a cause of a sudden rise in prices of all of digital coherent DSP-LSIs and optical transmission equipments.

Further, another customer C operates the optical transmission equipment at transmission speed of 10 Gbit/s immediately after purchase. However, according to an increase in communication traffic, the customer C desires to upgrade the transmission speed to 100 Gbit/s. In this case, in order to upgrade the functions in the optical transmission equipment, the client C needs to replace the coherent DSP-LSI with a higher-function coherent DSP-LSI. In this way, there is a problem in that the upgrade of the functions involves considerably complicated work.

The problem explained above is not only a problem of the optical transmission equipment but also a problem common to various processing equipments implemented with a variety of functions.

The present invention has been devised in order to solve the problem explained above and an object of the present invention is to obtain a processing equipment and a remote management system that can enable or disable a part or all of functions of the processing equipment without replacing devices and the like in the processing equipment even after the processing equipment is started to be used.

Solution to Problem

A processing equipment according to the present invention includes: a processing unit having a plurality of functions; a retaining unit retaining a device identifier capable of identifying the processing equipment; an interface unit receiving a function authentication key which is a code for setting a specific function among the plurality of functions to be enabled or disabled; and a control unit setting the specific function to be enabled or disabled according to the function authentication key when a device identifier included in the received function authentication key coincides with the device identifier retained in the retaining unit.

Advantageous Effects of Invention

The present invention makes it possible to enable or disable a part or all of functions of the processing equipment without replacing devices and the like in the processing equipment even after the processing equipment is started to be used.

BRIEF DESCRIPTION OF THE DRAWINGS

FIG. 7 is a diagram showing an example of information retained in an information retaining unit of an optical transmission equipment according to the second embodiment of the present invention.

FIG. 8 is a diagram showing an example of information retained in an information retaining unit of an optical transmission equipment according to the second embodiment of the present invention.

FIG. 9 is a diagram showing an example of information retained in an information retaining unit of an optical transmission equipment according to the second embodiment of the present invention.

FIG. 10 is a diagram showing an example of information retained in an information retaining unit of an optical transmission equipment according to the second embodiment of the present invention.

FIG. 11 is a diagram showing a processing flow of the remote management system according to the second embodiment of the present invention.

FIG. 15 is a diagram showing information retained in an information retaining unit of the optical transmission equipment according to the third embodiment of the present invention.

FIG. 18 is a diagram showing processing of the calculation step for the number of necessary licenses according to the third embodiment of the present invention.

FIG. 20 is a diagram showing transition of information retained in the information retaining unit according to the third embodiment of the present invention.

DESCRIPTION OF EMBODIMENTS

Figure 1:
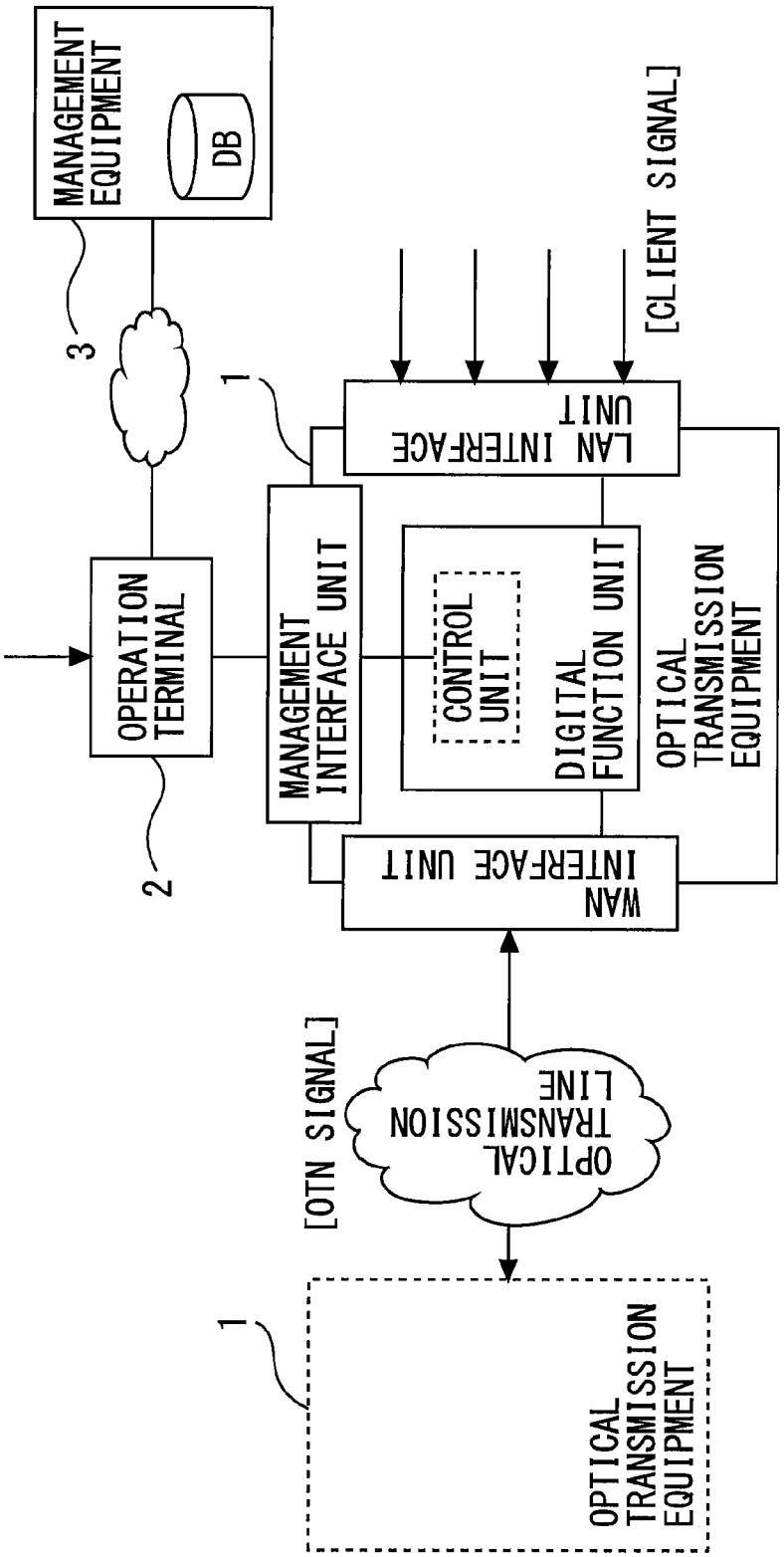
FIG. 1 is a diagram showing a remote management system according to a first embodiment of the present invention.

The present invention relates to a remote management system that enables/disables, on the basis of a license code sent to a processing equipment implemented with a variety of functions from a remote place, a part or all of functions of the processing equipment. Alternatively, the present invention relates to a processing equipment that enables, on the basis of a function authentication key sent from a remote place, enabling/disabling of a part or all of functions implemented in the processing equipment. In the following explanation, embodiments of the present invention are explained with reference to, as an example of a processing equipment, an optical transmission equipment using a digital coherent optical transmission technique. However, a processing equipment to which the present invention is applicable is not limited to the optical transmission equipment. The same or corresponding components are denoted by the same reference numerals and signs and redundant explanation of the components is sometimes omitted.

First Embodiment (Configuration of a Remote Management System)

FIG. 1 is a diagram showing a remote management system according to a first embodiment of the present invention. The remote management system includes an optical transmission equipment 1, an operation terminal 2, and a management equipment 3.

The optical transmission equipment 1 is a processing equipment that transparently stores a client signal of, for example, 100 GbE (Gigabit Ethernet) (Ethernet is a registered trademark), in an OTN frame, superimposes the client signal on a laser light, which is a carrier wave, and transmits the client signal to an optical transmission line. Details of the configuration of the optical transmission equipment 1 are explained below.

The operation terminal 2 is a computer device that instructs, according to operation by an operating person (hereinafter referred to as operator), the optical transmission equipment 1 connected to the operation terminal 2 to enable or disable a specific function already implemented in the optical transmission equipment 1. The operation terminal 2 requests, according to necessity, the management equipment 3 to issue a function authentication key, which is a code for setting a specific function among a plurality of functions implemented in the optical transmission equipment 1 to be enabled or disabled and transfers the function authentication key issued by the management equipment 3 to the optical transmission equipment 1.

The operation terminal 2 can fulfill functions necessary for a general-purpose computer device. In this case, software for exchanging various signals or various kinds of information between the optical transmission equipment 1 and the management equipment 3 on the basis of operation by the operator (hereinafter referred to as management software) is installed in the operation terminal 2. In an example shown in FIG. 1, the operation terminal 2 is shown as a device separate from the optical transmission equipment 1. However, a configuration may be adopted in which functions of the operation terminal 2 are implemented on the inside of the optical transmission equipment 1 and operation by the operator is automatically carried out by the functions inside the optical transmission equipment 1.

The operation terminal 2 is connected to a management interface unit of the optical transmission equipment 1. A variety of forms can be adopted as connection between the optical transmission equipment 1 and the operation terminal 2. For example, the management interface unit is an RS-232 serial interface and the optical transmission equipment 1 and the operation terminal 2 are connected by a serial cable. Alternatively, the management interface unit may be various LAN interfaces and the optical transmission equipment 1 and the operation terminal 2 may be connected via a LAN. In the latter case, the optical transmission equipment 1 and the operation terminal 2 perform transmission and reception of information using a TCP/IP protocol. When the connection is the connection by the serial cable, the operation terminal 2 is typically disposed near a site where the optical transmission equipment 1 is set. When the connection is the connection by the LAN, the operation terminal 2 can be set not only near the site where the optical transmission equipment 1 is set but also in a remote position.

The management equipment 3 is a computer device that receives an issuance request for a function authentication key from the operation terminal 2, verifies right or wrong of issuance (i.e., appropriateness of enabling of a specific function implemented in the optical transmission equipment 1 connected to the operation terminal 2) on the basis of device information, and issues a function authentication key corresponding to a result of the verification. The management equipment 3 includes a database (DB) that retains information necessary for issuing the function authentication key and is capable of exchanging various signals and various kinds of information with the operation terminal 2. The exchange of the information between the management equipment 3 and the operation terminal 2 is performed by communication via, for example, a LAN, the Internet, or a leased line. If the TCP/IP protocol is used, the communication between both the devices can be easily realized. However, a method of exchanging the various signals and the various kind of information between the management equipment 3 and the operation terminal 2 is not limited to the communication. For example, it is also possible that information is stored in a medium such as an optical disk or a flash memory and the medium is moved to exchange the information between both the devices.

In order to explain the operation of the remote management system according to this embodiment, a scenario is assumed in which "at a point in time when operation of the optical transmission equipment 1 is started, only a part of the functions of the optical transmission equipment 1 are used but, as time elapses, the operator desires to use a more superior function". In this case, the remote management system performs the processing explained below.

(Step 0: Function Setting Step)

The operation terminal 2 instructs, on the basis of operation by the operator, the optical transmission equipment 1 connected to the operation terminal 2 to enable a function desired to be used among the functions of the optical transmission equipment 1.

(Step 1: License Request Step)

When determining that the optical transmission equipment 1 needs to have a function authentication key additionally issued in order to enable the function designated by the operation terminal 2, the optical transmission equipment 1 transmits a device identifier retained in an information retaining unit 11 and necessary device information to the operation terminal 2 and requests the operation terminal 2 to issue the function authentication key. The operation terminal 2 sends information concerning the desired function and the device information to the management equipment 3 and requests issuance of the function authentication key.

(Step 2: License Issuance Step)

The management equipment 3 verifies appropriateness of enabling of the function requested to the optical transmission equipment 1. When it is determined that the enabling of the function is appropriate, the management equipment 3 issues a function authentication key for enabling a function of the optical transmission equipment 1 and sends the function authentication key to the operation terminal 2.

(Step 3: Function Setting Step)

The operation terminal 2 transmits the function authentication key to the optical transmission equipment 1. The optical transmission equipment 1 receives and applies the function authentication key, whereby the function designated by the operation terminal 2 is enabled.

Details of processing in the remote management system are explained below. Note that those skilled in the art can naturally understand that the remote management system according to this embodiment effectively works on scenarios other than the scenario explained above.

(Configuration of the Optical Transmission Equipment, which is the Processing Equipment)

Figure 2:
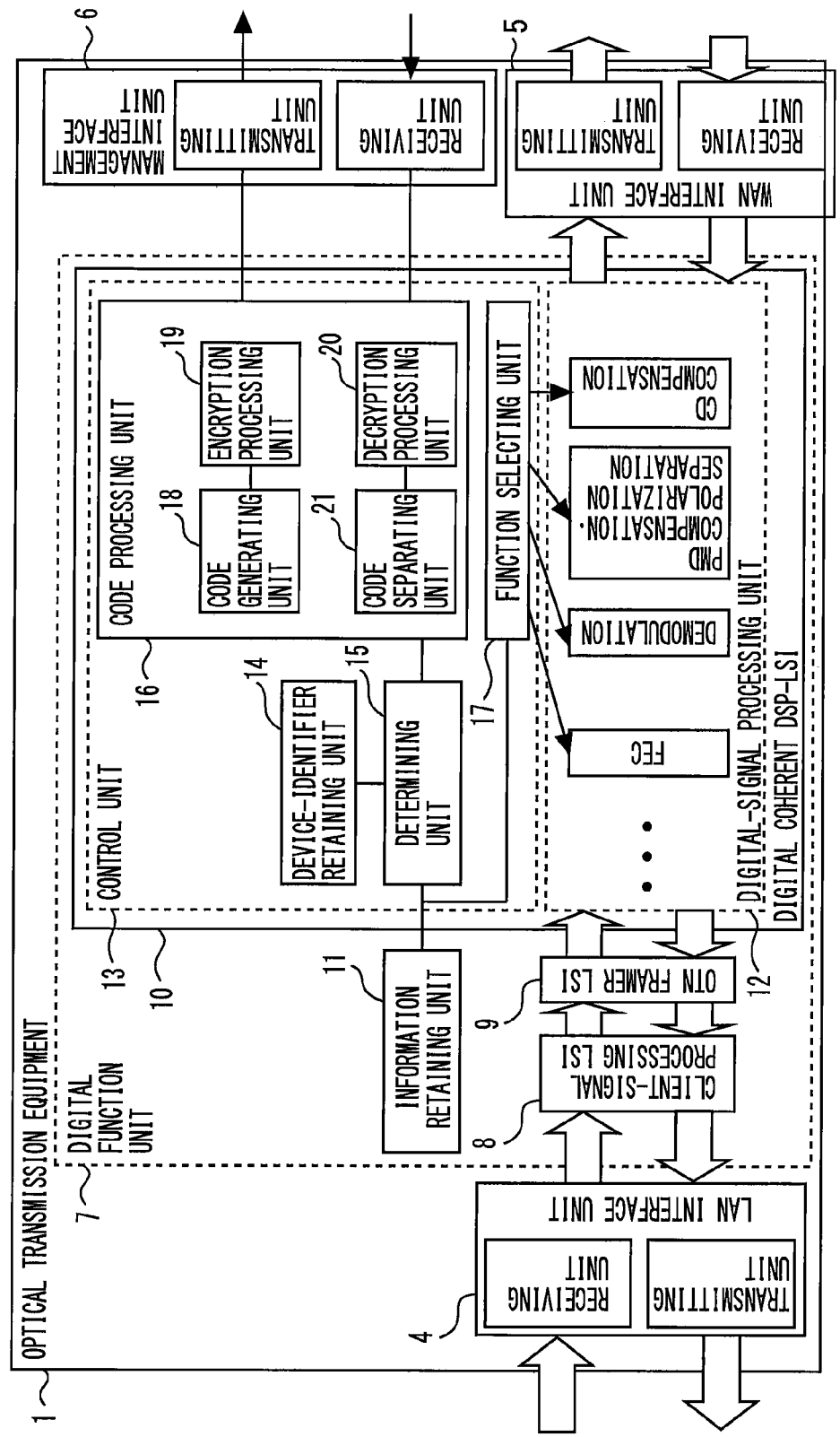
FIG. 2 is a diagram showing the optical transmission equipment according to the first embodiment of the present invention.

FIG. 2 is a diagram showing the optical transmission equipment according to the first embodiment of the present invention. The optical transmission equipment 1 includes a LAN interface unit 4, a WAN interface unit 5, a management interface unit 6, and a digital function unit 7. The digital function unit 7 includes a client-signal processing LSI 8, an OTN framer LSI 9, a digital coherent DSP-LSI 10, and the information retaining unit 11. The digital coherent DSP-LSI 10 includes a digital-signal processing unit 12 and a control unit 13.

The LAN interface unit 4 is an interface that inputs and outputs a client signal. The client-signal processing LSI 8 performs termination processing of the client signal. The OTN framer LSI 9 transparently stores the client signal in an OTN frame and forms the OTN frame. The digital-signal processing unit 12 has a plurality of functions necessary for performing coherent detection of an optical signal via the WAN interface unit 5. The functions necessary for the coherent detection are, for example, chromatic dispersion (CD) compensation and polarization mode dispersion (PMD) compensation, polarization separation, demodulation processing of a modulated signal, and error correction (FEC) processing. The WAN interface unit 5 transmits and receives an OTN signal obtained by superimposing an OTN frame on a laser light, which is a carrier wave, between the WAN interface unit 5 and the opposed optical transmission equipment 1. The configuration explained above is the same as the configuration of the optical transmission equipment 1 using the conventional digital coherent technique.

The control unit 13 cooperates with the information retaining unit 11 to play a role most important in carrying out the present invention. The control unit 13 includes a device-identifier retaining unit 14, a determining unit 15, a code processing unit 16, and a function selecting unit 17. The code processing unit 16 includes a code generating unit 18, an encryption processing unit 19, a decryption processing unit 20, and a code separating unit 21. The code generating unit 18 and the encryption processing unit 19 generate various signals to be transmitted to the operation terminal 2 via the management interface unit 6. The decryption processing unit 20 and the code separating unit 21 decode the various signals transmitted by the operation terminal 2 and received via the management interface unit 6. The device-identifier retaining unit 14 retains a device identifier (ID) capable of identifying the optical transmission equipment 1 uniquely allocated to the digital coherent DSP-LSI 10, which is a control target. The device identifier may be any form as long as a person carrying out the present invention can appropriately manage or give the device identifier. The device identifier may be a value fixedly set during manufacturing of the digital coherent DSP-LSI 10. A random number generator may be provided in the device-identifier retaining unit 14. A random number randomized to a degree for not overlapping device identifiers of other digital coherent DSP-LSIs 10 may be used in operation. A specific embodiment of the control unit 13 is explained in detail in explanation of a processing flow below.

In FIG. 2, the digital-signal processing unit 12 and the control unit 13 are mounted on the same hardware processor (digital coherent DSP-LSI 10). However, the digital-signal processing unit 12 and the control unit 13 are not limited to this. The digital-signal processing unit 12 and the control unit 13 may be mounted on different hardware processors. Alternatively, the control unit 13 may be a general-purpose processor capable of performing software processing. For example, the digital-signal processing unit 12 may be a network processor capable of performing hardware processing. A general-purpose processor electrically connected to the digital-signal processing unit 12 may be provided on the outside of the network processor as the control unit 13. In this case, control software for executing a function of the control unit 13 is stored in a nonvolatile memory such as a read-only memory (ROM) or a flash memory electrically connected to the general-purpose processor. The general-purpose processor reads out the control software from the nonvolatile memory and executes the control software during the start of the optical transmission equipment 1.

(Configuration of the Information Retaining Unit)

The information retaining unit 11 retains a device identifier, which is an ID, of the digital coherent DSP-LSI 10 and device information such as device status information acquired from the control unit 13. Further, the information retaining unit 11 also retains a function authentication key issued by the management equipment 3. These kinds of information are provided to the control unit 13 according to an instruction of the determining unit 15. The information retaining unit 11 only has to be a nonvolatile memory such as an EEPROM (Electrically Erasable Programmable Read-Only Memory). Note that, depending on a use of the remote management system, it is also possible to use a volatile memory as the information retaining unit 11. When the information retaining unit 11 is the nonvolatile memory, the information retaining unit 11 may also include a function of the device-identifier retaining unit 14 included in the control unit 13. In this case, the control unit 13 does not need to include the device-identifier retaining unit 14. In this way, important information necessary for remote management and setting of the function of the optical transmission equipment 1 is retained in the information retaining unit 11. Therefore, in order to prevent the retained information from being defrauded by a malicious outsider through impersonation or wire tapping or in order to prevent rewriting of the retained information by a malicious outsider, the information retaining unit 11 desirably performs appropriate management to, for example, encrypt and retain information.

Figure 3:
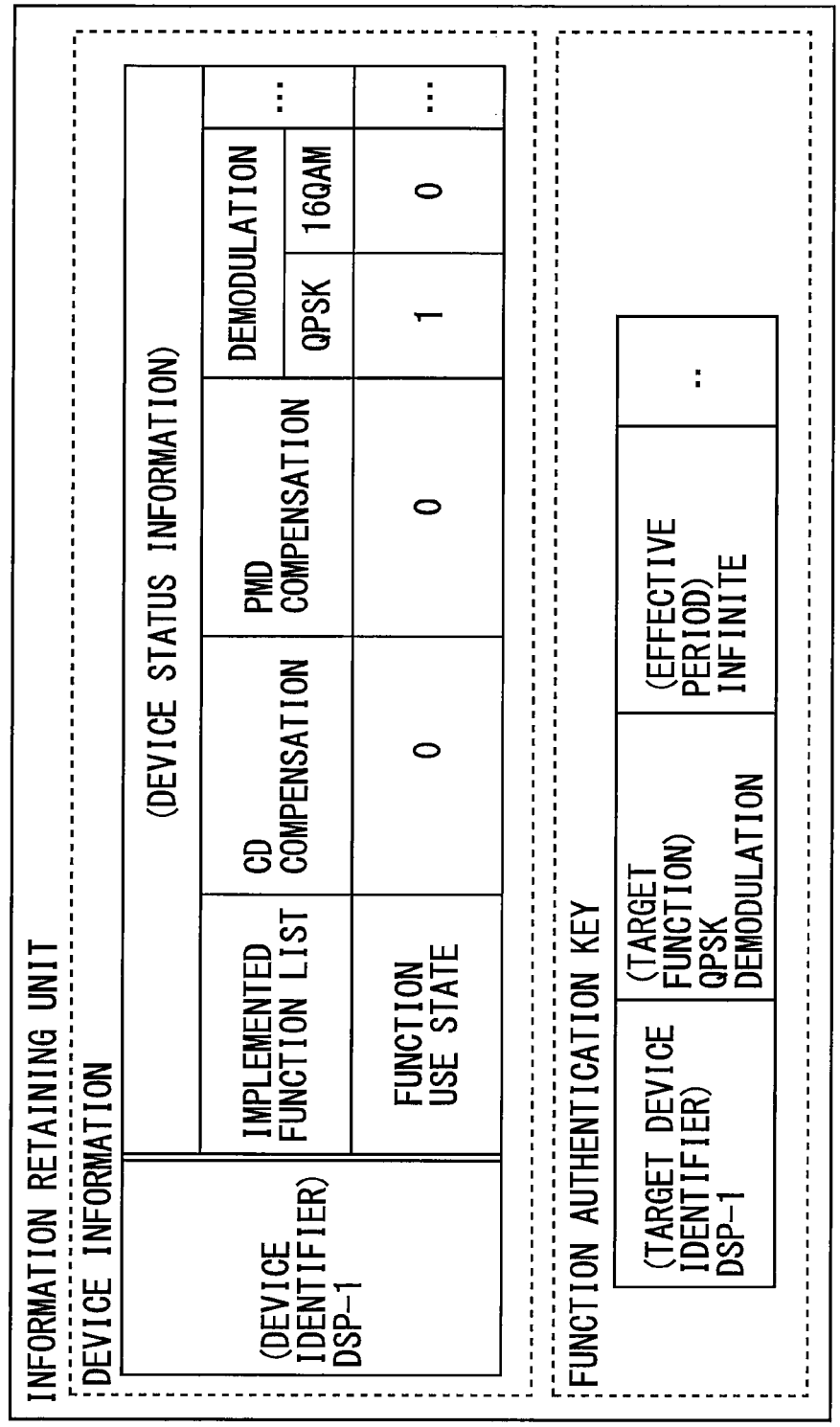
FIG. 3 is a diagram showing an example of information retained in the information retaining unit.

FIG. 3 is a diagram showing an example of information retained in the information retaining unit. As explained above, the device identifier retained in the device-identifier retaining unit 14 of the control unit 13 is copied and retained in the information retaining unit 11.

The device status information includes at least functions already implemented in the digital coherent DSP-LSI 10 at a point in time of manufacturing (hereinafter referred to as implemented functions) and a present state of use (enabled or disabled) of the functions. Note that, in a "function use state" field in FIG. 3, 0 indicates an ineffective (disabled) state and 1 indicates an effective (enabled) state. Besides the above, as the device status information, various kinds of information such as version information, error information, and an elapsed time after power-on of the digital coherent DSP-LSI 10 can be adopted according to a form of the digital coherent DSP-LSI 10. These kinds of information are generated in cooperation with the control unit 13 encoded in a form readable by the control unit 13 and retained in the information retaining unit 11.

The function authentication key is an authentication key issued by the management equipment 3 and used for enabling or disabling a function implemented in the digital coherent DSP-LSI 10 included in the optical transmission equipment 1. The function authentication key includes at least a device identifier (equivalent to a target device identifier in FIG. 3) of the digital coherent DSP-LSI 10 on which the function authentication key should act and information concerning a function that should be enabled (equivalent to a target function in FIG. 3). Besides, various kinds of information such as information concerning a period in which the function authentication key effectively works (equivalent to an effective period in FIG. 3) can be adopted according to forms of the digital coherent DSP-LSI 10 and the remote management system. In order to enable processing of both of enabling and disabling of the function for the digital coherent DSP-LSI 10, a function setting flag for instructing either one of enabling and disabling of the target function only has to be included in the function authentication key. Note that the target function and the other device information are converted into appropriate codes decodable by the optical transmission equipment 1 and the management equipment 3 and included in the function authentication key.

As explained above, the function authentication key is encrypted and supplied to the optical transmission equipment 1 as a license code, which is a signal format for transmission to the optical transmission equipment 1. From the viewpoint of information leak prevention, the function authentication key may be retained in the information retaining unit 11 while keeping a form of the license code, that is, an encrypted state.

Note that device identifiers and device information such as device status information related to all the digital coherent DSP-LSIs 10 included in the optical transmission equipment 1 that should be managed by the management equipment 3 are retained beforehand in the DB included in the management equipment 3. The "information necessary for issuing a function authentication key" stored by the DB included in the management equipment 3 explained in the explanation of FIG. 1 includes these kinds of information.

(Explanation of Processing by the Remote Management System)

Figure 4:
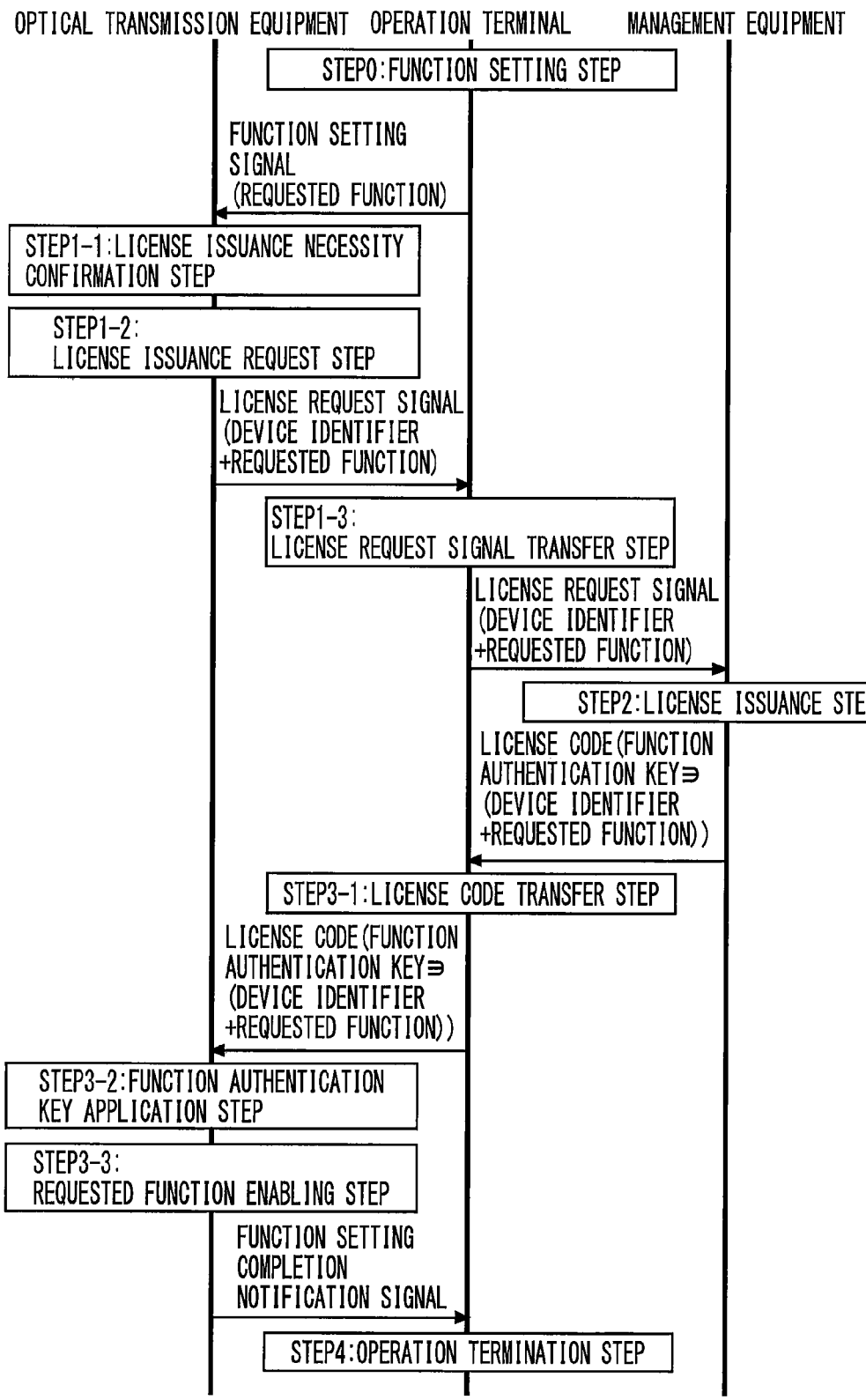
FIG. 4 is a diagram showing a processing flow of the remote management system according to the first embodiment of the present invention.

Processing by the remote management system according to this embodiment is explained in detail below with reference to the drawings. FIG. 4 is a diagram showing a processing flow of the remote management system according to the first embodiment of the present invention. Note that, in the following explanation, processing for, targeting one optical transmission equipment 1 on which one digital coherent DSP-LSI 10 is mounted as shown in FIG. 2, enabling a specific function not enabled in the digital coherent DSP-LSI 10 with an instruction by the operation terminal 2 as a trigger is explained. In order to perform processing for both of enabling and disabling of functions for the digital coherent DSP-LSI 10, the function setting flag explained above only has to be included in a signal communicated between the devices in a processing flow explained below.

(Step 0: Function Setting Step)

The operation terminal 2 starts management software according to operation by the operator to allow the optical transmission equipment 1 connected to the operation terminal 2 to receive processing concerning remote management of a function implemented in the optical transmission equipment 1. The operation terminal 2 specifies, according to operation of the management software by the operator, a function desired to be used (hereinafter referred to as requested function) among the functions implemented in the digital coherent DSP-LSI 10 of the optical transmission equipment 1 connected to the operation terminal 2 and sends a function setting signal, which is a signal for instructing enabling of the requested function, to the management interface unit 6 of the optical transmission equipment 1.

(Step 1: License Request Step)

(Step 1-1: License Issuance Necessity Confirmation Step)

When a receiving unit of the management interface unit 6 of the optical transmission equipment 1 receives the function setting signal, the function setting signal is sent to the determining unit 15. Note that, in FIG. 2, a configuration is shown in which the function setting signal is sent to the determining unit 15 through the code processing unit 16. However, the transmission and reception of the function setting signal is not always limited to such a configuration. The determining unit 15 only has to be capable of appropriately receiving the function setting signal on the basis of an implementation form of the digital coherent DSP-LSI 10.

Figure 5:
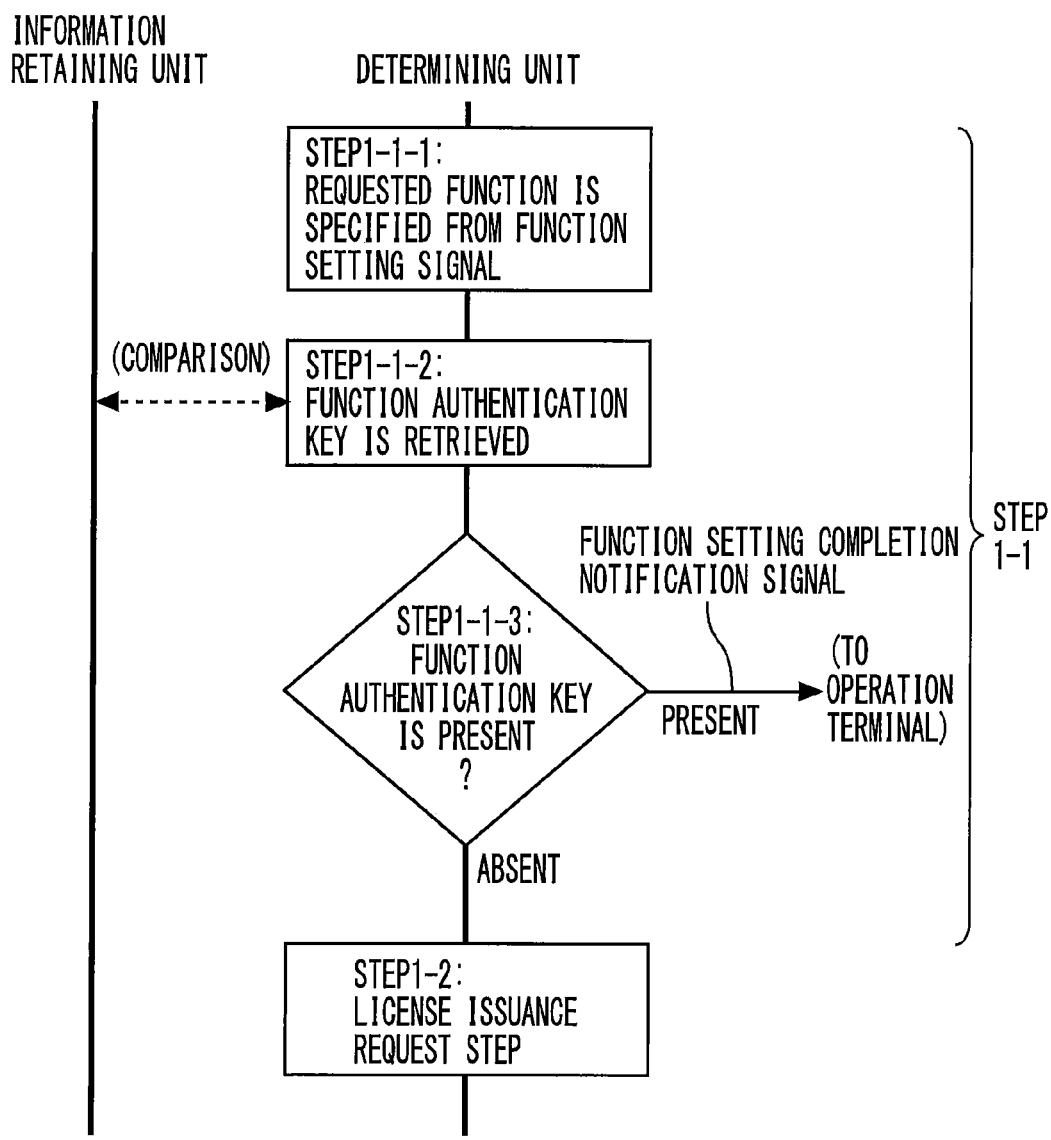
FIG. 5 is a diagram showing a processing flow of a license issuance necessity confirmation step according to the first embodiment of the present invention.

FIG. 5 is a diagram showing a processing flow of a license issuance necessity confirmation step according to the first embodiment of the present invention. The determining unit 15, which receives the function setting signal, specifies a requested function from the function setting signal (Step 1-1-1). The determining unit 15 accesses the information retaining unit 11 and retrieves a function authentication key related to the specified requested function (Step 1-1-2) and confirms whether the relevant function authentication key is present in the information retaining unit 11 (Step 1-1-3). When the relevant function authentication key is present, the determining unit 15 determines that the requested function is already enabled and it is unnecessary to obtain a function authentication key anew, generates a function setting completion notification signal, and transits the function setting completion notification signal to the operation terminal 2 via a transmitting unit of the management interface unit 6. On the other hand, when the function authentication key related to the requested function is absent in the information retaining unit 11, the determining unit 15 processes the next step Step 1-2. Note that, when the function authentication key includes a period in which the function authentication key effectively works (an effective period) as shown in FIG. 3, in Step 1-1-3 explained above, the determining unit 15 not only confirms presence of the function authentication key but also confirms whether the function authentication key is within a period in which the function is usable.

(Step 1-2: License Issuance Request Step)

The determining unit 15 acquires at least a device identifier from the information retaining unit 11 or the device-identifier retaining unit 14. Further, the determining unit 15 sends the acquired device identifier and information concerning the requested function specified from the function setting signal to the code processing unit 16 and instructs the code processing unit 16 to generate a license request signal including the device identifier and the information concerning the requested function.

The license request signal includes at least the device identifier and the information concerning the requested function and is a signal for notifying the device identifier to the management equipment 3. However, to prevent content of a code including the device identifier from being grasped even if the license request signal is glanced furtively on the outside of the optical transmission equipment 1, the content should be concealed by appropriate concealing means as explained below.

The code processing unit 16, which receives the instruction of the determining unit 15, generates a code including the device identifier and the requested function with the code generating unit 18. The code generating unit 18 gives a delimiter having a predetermined length and including a predetermined code to, for example, before and after the device identifier and the requested function. The management equipment 3 also grasps the delimiter and decodes the device identifier and the requested function with the delimiter as a mark. Note that the code generating unit 18 may integrate the information concerning the device identifier and other information and create a code. In that case, if the delimiter is appropriately given, the management equipment 3 can decode various kinds of information transmitted by the optical transmission equipment 1.

The code generated by the code generating unit 18 is sent to the encryption processing unit 19 of the code processing unit 16. The encryption processing unit 19 encrypts the code with a predetermined algorithm and creates a license request signal to be sent to the management equipment 3. The encryption processing unit 19 encrypts the code using, for example, a public key in a public key encryption scheme as encrypting means for generating the license request signal. By using the public key encryption scheme, it is unnecessary to implement a secret key in the digital coherent DSP-LSI 10. Therefore, it is possible to prevent a drain of the secret key due to wire tapping or the like and prevent a leak of the device identifier. The encrypted license request signal is sent from the encryption processing unit 19 to a transmitting unit of the management interface unit 6. The transmitting unit of the management interface unit 6 transmits the license request signal to the operation terminal 2.

Note that, in any encryption algorithm such as a common key scheme or a public key scheme, an encryption key of the scheme is embedded in the digital coherent DSP-LSI 10 as hardware implementation. Therefore, it is difficult for an outsider to read the encryption key from the outside. By using a function for enabling writing only once during shipment such as one-time programmable, it is also possible to differentiate, for each chip, an encryption key written during shipment of the digital coherent DSP-LSI 10. In this case, even if an encryption key of a certain chip leaks, it is possible to reduce a risk that even encryption keys written in other chips are learnt by an outsider.

(Step 1-3: License Request Signal Transfer Step)

The operation terminal 2, which receives the license request signal as a response to the function setting signal, converts the received license request signal into an appropriate signal format communicable with the management equipment 3 according to necessity and transmits the license request signal to the management equipment 3. The operation terminal 2 may automatically transmit the license request signal after receiving the license request signal according to a command described in the management software. The operation terminal 2 may wait for operation of the management software by the operator and transmit the license request signal on the basis of an instruction of the operator.

Note that the operation terminal 2 does not retain a decryption key (equivalent to a secret key when the public key encryption scheme is used) for decrypting the license request signal. Therefore, the operation terminal 2 cannot decrypt the license request signal and cannot detect the device identifier. As explained above, communication by radio or wire may be used as means for communicating the license request signal between the operation terminal 2 and the management equipment 3. Alternatively, the storage medium may be moved from the operation terminal 2 to the management equipment 3 to pass the license request signal.

(Step 2: License Issuance Step)

The management equipment 3, which receives the license request signal, decrypts the license request key using the decryption key and decodes the device identifier and the requested function. When the public key encryption scheme is used for encryption of the license request signal, the license request signal is decrypted using the secret key. In this case, the secret key is implemented only in the management equipment 3. The other devices or terminals cannot decrypt the license request signal. It is possible to prevent a leak of the device identifier. The management equipment 3 verifies appropriateness of enabling a desired requested function for the digital coherent DSP-LSI 10 corresponding to the decoded device identifier.

The management equipment 3 searches through a database (DB) included in the management equipment 3 using the decoded device identifier as a key and confirms whether the device identifier is present. When the device identifier is absent, the management equipment 3 determines that the enabling of the requested function is ineffective and stops the processing flow of the remote management system. The management equipment 3 may perform predetermined termination processing.

When the device identifier described in the license request signal is present, the management equipment 3 further searches through the DB and confirms an "implemented function list" of the digital coherent DSP-LSI 10 corresponding to the device identifier. When it is confirmed that the relevant function is not implemented in the digital coherent DSP-LSI 10, a function of which should be enabled, the management equipment 3 determines that the enabling of the requested function is ineffective and stops the processing flow of the remote management system. Alternatively, the management equipment 3 may perform predetermined termination processing. Further, the management equipment 3 searches through the DB and confirms a "list of currently enabled functions" corresponding to the device identifier. When it is confirmed that a desired function of the digital coherent DSP-LSI 10 is already enabled, the management equipment 3 may determine that the enabling of the requested function is unnecessary and stops the processing flow of the remote management system. Alternatively, the management equipment 3 may perform predetermined termination processing.

In the processing explained above, when it is confirmed that the requested function is implemented in the digital coherent DSP-LSI 10 corresponding to the device identifier described in the license request signal and the requested function is not enabled at the present point in time, the management equipment 3 determines that it is appropriate to enable the desired requested function. However, the management equipment 3 does not always need to execute a process for confirming whether the requested function is enabled.

Note that, for example, when the management equipment 3 and a publicly-known billing system are combined to perform the appropriateness determination, presence or absence of royalty payment for using the requested function may be used as a basis of decision.

When it is determined that the enabling of the requested function is appropriate as a result of the verification, the management equipment 3 issues a function authentication key delivered to the optical transmission equipment 1 in order to enable the requested function. The management equipment 3 retains the issued function authentication key in a license code, which is a signal form for transmission to the optical transmission equipment 1 and transmits the function authentication key to the operation terminal 2.

The function authentication key includes at least the device identifier transmitted by the optical transmission equipment 1, which is the control target, and the information indicating the requested function that should be enabled. The function authentication key may have a configuration in which, for example, a delimiter having a predetermined length and including a predetermined code is given to before and after the device identifier and the requested function.

To prevent content of the function authentication key from being grasped even if the license request signal is glanced furtively on the outside of the optical transmission equipment 1 or the management equipment 3 or prevent the license code from being rewritten to be tampered into a different device identifier, the license code is desirably concealed by appropriate encoding means.

(Step 3: Function Setting Step)

(Step 3-1: License Code Transfer Step)

The operation terminal 2, which receives the license code as a response to the license request signal, transfers the license code to the management interface unit 6 of the optical transmission equipment 1 connected to the operation terminal 2.

Note that, since the operation terminal 2 does not retain a decryption key for decrypting the license code, the operation terminal 2 cannot decrypt the license code. Therefore, the operator of the operation terminal 2 cannot read content of the license code. It is possible to prevent content of the license code from leaking.

However, the operation terminal 2 can learn that the license code arrives. Therefore, it is possible to perceive that the enabling of the requested function for the designated digital coherent DSP-LSI 10 is approved by the management equipment 3.

(Step 3-2: Function Authentication Key Application Step)

When the receiving unit of the management interface unit 6 of the optical transmission equipment 1 receives the license code, the license code is sent to the decryption processing unit 20 of the code processing unit 16. The decryption processing unit 20, which receives the license code, decrypts the license code and generates a function authentication key. The decryption processing unit 20 transmits the function authentication key, which is decrypted to be a plain text, to the code separating unit 21. The code separating unit 21 separates and extracts the device identifier from the received function authentication key and transmits the device identifier and the function authentication key to the determining unit 15.

Figure 6:
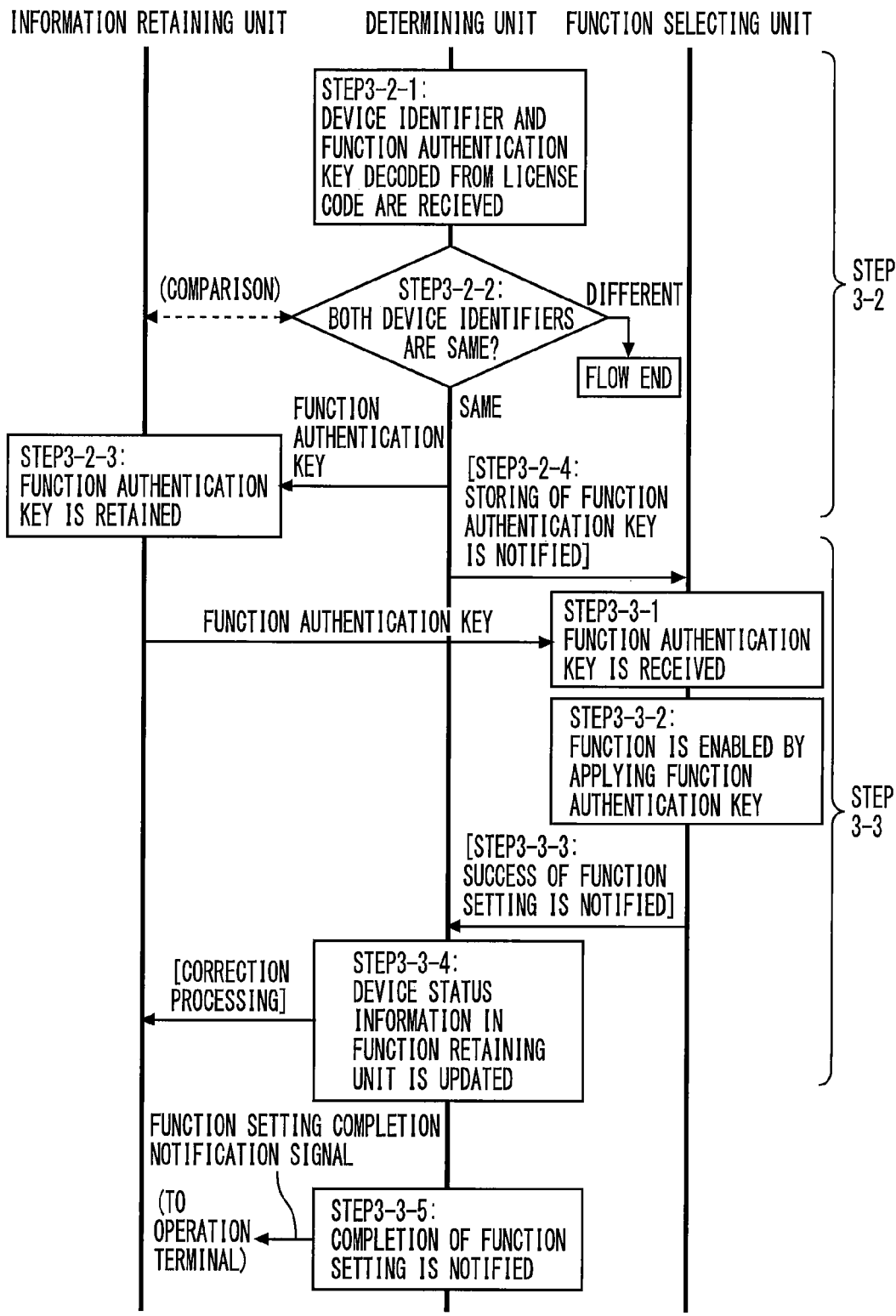
FIG. 6 is a diagram showing processing flows of the function authentication key application step and a requested function enabling step according to the first embodiment of the present invention.

FIG. 6 is a diagram showing processing flows of the function authentication key application step and a requested function enabling step according to the first embodiment of the present invention. The determining unit 15, which receives the device identifier and the function authentication key (Step 3-2-1), compares the device identifier transferred from the code separating unit 21 and the device identifier retained in the information retaining unit 11 or the device-identifier retaining unit 14 (Step 3-2-2). When both the device identifiers coincide with each other, the determining unit 15 determines that a preceding license code is transmitted to the determining unit 15 and proceeds to the next processing. When both the device identifiers are different, the determining unit 15 discards the received device identifier and the received function authentication key and ends the determination processing flow.

When it is determined that the function authentication key is transmitted to the determining unit 15, the determining unit 15 retains the function authentication key transferred from the code processing unit 16 in the information retaining unit 11 (Step 3-2-3). Alternatively, the determining unit 15 may retain the function authentication key (the license code) in the encrypted state transmitted from the management equipment 3 in the information retaining unit 11. At the same time, the determining unit 15 notifies the function selecting unit 17 that the function authentication key is added to the information retaining unit 11 anew (Step 3-2-4).

(Step 3-3: Requested Function Enabling Step)

The function selecting unit 17 accesses the information retaining unit 11 on the basis of the notification from the determining unit 15 and receives all function authentication keys included in the information retaining unit 11 (Step 3-3-1). When the function authentication keys are retained in the information retaining unit 11 as license codes in the encrypted state, after sending the license codes to the decryption processing unit 20 once and causing the decryption processing unit 20 to decrypt the license codes, the function selecting unit 17 may receive the function authentication keys.

The function selecting unit 17 applies the received all function authentication keys and individually enables functions designated by the function authentication keys (Step 3-3-2). After performing the function setting, the function selecting unit 17 transmits a signal for notifying that the function setting is successful to the determining unit 15 (Step 3-3-3). The determining unit 15, which receives the notification from the function selecting unit 17, updates a function use state for a function enabled anew in the device status information retained in the information retaining unit 11 to "1" (Step 3-3-4).

The determining unit 15 generates a function setting completion notification signal for notifying the operation terminal 2 that the function designated by the function authentication key is enabled for the digital coherent DSP-LSI 10 and transmits the function setting completion notification signal to the operation terminal 2 via the transmitting unit of the management interface unit 6 (Step 3-3-5).

(Step 4: Operation Termination Step)

The operation terminal 2, which receives the function setting completion notification signal, terminates the processing concerning the remote setting of the function in the optical transmission equipment 1 started according to the command of the management software.

As explained above, in the remote management system according to this embodiment, even after the optical transmission equipment 1, which is the processing equipment, is started to be used, without replacing the digital coherent DSP-LSI 10 in the optical transmission equipment 1, it is possible to enable or disable a part or all of the functions implemented in the LSI according to operation from a remote place.

When the management equipment 3 issues the function authentication key for setting a function of the digital signal processing unit 12 (the digital coherent DSP-LSI 10) according to operation from a remote place, the device identifier of the digital coherent DSP-LSI 10 transmitted by the optical transmission equipment 1 is included in the function authentication key. Therefore, it is possible to prevent diversion of function authentication keys issued to other processing equipments. If the device identifier retained in the optical transmission equipment 1 is concealed and retained and information communicated between the optical transmission equipment 1 and the management equipment 3 is encrypted, the device identifier cannot be easily recognized by an outsider. Therefore, it is also possible to prevent falsification of the function authentication key.

Second Embodiment

The configurations of a remote management system and the optical transmission equipment 1 (a processing equipment) according to a second embodiment of the present invention are the same as the configurations in the first embodiment. However, the configurations of device information and a function authentication key retained in the information retaining unit 11 are different from the configurations in the first embodiment.

FIGS. 7 to 10 are diagrams showing an example of information retained in an information retaining unit of an optical transmission equipment according to the second embodiment of the present invention. Unlike the first embodiment, a "number of times of license issuance", which is a total number of function authentication keys respectively issued to a plurality of functions implemented in the digital coherent DSP-LSI 10, is included in device status information and a function authentication key.

(Explanation of Processing by the Remote Management System)

Processing by the remote management system according to this embodiment is explained in detail below with reference to the drawings. FIG. 11 is a diagram showing a processing flow of the remote management system according to the second embodiment of the present invention. Note that, in the following explanation, processing flows of both of setting for enabling a function not enabled for the digital coherent DSP-LSI 10 and setting for disabling an enabled function are explained.

(Step 0: Function Setting Step)

As in the first embodiment, the operation terminal 2 specifies, according to operation by the operator, a function to be enabled or disabled (hereinafter referred to as requested function) among the functions implemented in the digital coherent DSP-LSI 10 of the optical transmission equipment 1 connected to the operation terminal 2 and sends the requested function and a function setting signal including function setting information for instructing enabling or disabling of the requested function to the optical transmission equipment 1.

(Step 1: License Request Step)

(Step 1-1: License Issuance Necessity Confirmation Step)

Figure 12:
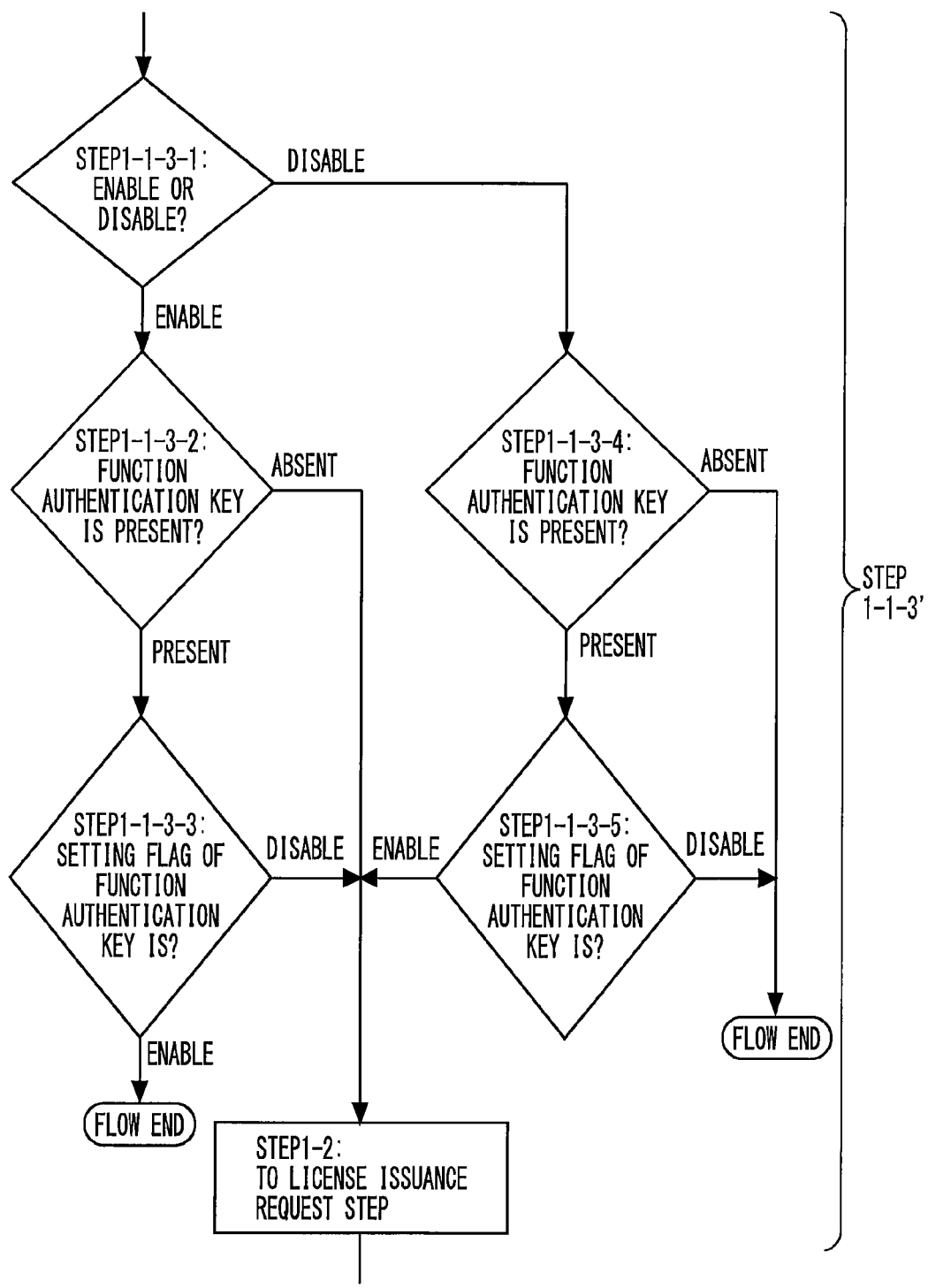
FIG. 12 is a diagram showing a part of a processing flow of the license issuance necessity confirmation step according to the second embodiment of the present invention.

A license issuance necessity confirmation step in this embodiment is substantially the same as the license issuance necessity confirmation step in the first embodiment. However, processing in Step 1-1-3 is different. FIG. 12 is a diagram showing a part of a processing flow of the license issuance necessity confirmation step according to the second embodiment of the present invention. In the first embodiment, in Step 1-1-3, the control unit 13 of the optical transmission equipment 1 performs the operation for "when the function authentication key corresponding to the requested function is present in the information retaining unit 11, determining that it is unnecessary to obtain a new function authentication key because the requested function is already enabled and ending the processing flow". On the other hand, in the second embodiment, in order to enable processing of disabling of a function in the optical transmission equipment 1, Step 1-1-3' in FIG. 12 is adopted instead of Step 1-1-3 in the first embodiment. That is, after accessing the information retaining unit 11 and retrieving a function authentication key related to the requested function (Step 1-1-2), the determining unit 15 confirms whether a function setting signal instructs setting of enabling or designates setting of disabling (Step 1-1-3-1). When confirming that the function setting signal instructs the setting of enabling, the determining unit 15 confirms whether a function authentication key related to the requested function is present in the information retaining unit 11 (Step 1-1-3-2). When the function authentication key is absent, the relevant function is in an initial state, that is, disabled at the present point in time (content of the information retaining unit 11 is equivalent to FIG. 7). Therefore, the determining unit 15 processes the next step Step 1-2.

When the function authentication key related to the requested function is present in the information retaining unit 11, the determining unit 15 confirms a setting flag in the function authentication key (Step 1-1-3-3). When the setting flag is a flag of enabling (content of the information retaining unit 11 is equivalent to FIG. 8 or FIG. 10), the determining unit 15 determines that the requested function is already enabled and it is unnecessary to obtain a function authentication key anew, generates a function setting completion notification signal, transmits the function setting completion notification signal to the operation terminal 2, and ends the processing flow.

On the other hand, when the confirmed setting flag is a flag of disabling in Step 1-1-3-3 (content of the information retaining unit 11 is equivalent to FIG. 9), the determining unit 15 processes the next step Step 1-2.

When it is confirmed in Step 1-1-3-1 that the function setting signal instructs the setting of disabling, the determining unit 15 confirms whether a function authentication key related to the requested function is present in the information retaining unit 11 (Step 1-1-3-4). When the function authentication key is absent, the relevant function is in an initial state, that is, disabled at the present point in time (content of the information retaining unit 11 is equivalent to FIG. 7). Therefore, the determining unit 15 determines that it is unnecessary to obtain a function authentication key for disabling, generates a function setting completion notification signal, transmits the function setting completion notification signal to the operation terminal 2, and ends the processing flow.

When function authentication key related to the requested function is present in the information retaining unit 11, the determining unit 15 confirms a setting flag in the function authentication key (Step 1-1-3-5). When the setting flag is a flag of disabling (content of the information retaining unit 11 is equivalent to FIG. 9), the determining unit 15 determines that it is unnecessary to obtain a function authentication key for disabling, generates a function setting completion notification signal, transmits the function setting completion notification signal to the operation terminal 2, and ends the processing flow.

On the other hand, when the confirmed setting flag is a flag of enabling in Step 1-1-3-5 (content of the information retaining unit 11 is equivalent to FIG. 8 or FIG. 10), the determining unit 15 processes the next step Step 1-2 in order to obtain a function authentication key for disabling.

To sum up, the processing flow in FIG. 11 explained above is equivalent to performing processing shown in Table 1.

TABLE 1

| Function setting signal | Presence or absence of the function authentication key | Setting flag | Processing |
|---|---|---|---|
| Instruct enabling | Absent | — | Step 1-2 |
|  | Present | Enabling | End |
|  |  | Disabling | Step 1-2 |
| Instruct disabling | Absent | — | End |
|  | Present | Enabling | Step 1-2 |
|  |  | Disabling | End |

State of the function authentication key of the information retaining unit 11

(Step 1-2: License Issuance Request Step)

Processing same as Step 1-2 in the first embodiment is performed. However, the license issuance request step is different in that a license request signal generated by the determining unit 15 includes at least a device identifier, the number of times of license issuance, a requested function, and function setting information indicating which of enabling and disabling of the requested function is set.

The number of times of license issuance is a total number of function authentication keys issued to that point for each of the functions implemented in the digital coherent DSP-LSI 10 and already applied to the optical transmission equipment 1. Although details are explained below, by including the "number of times of license issuance" as device status information and adding information concerning the "number of times of license issuance" to a license request signal and notifying the information to the management equipment 3, it is possible to prevent a function authentication key issued in the past from being applied again to enable the requested function.

(Step 1-3: License Request Signal Transfer Step)

Processing same as Step 1-3 in the first embodiment is performed. However, a license request signal treated in this processing includes, as explained above, at least a device identifier, the number of times of license issuance, a requested function, and function setting information.

(Step 2: License Issuance Step)

Processing same as Step 2 in the first embodiment is performed. However, when the requested function is disabled, the management equipment 3 refers to a "list of currently enabled functions" corresponding to a device identifier of a setting target in a DB and, when confirming that the requested function is enabled, determines that issuance of a function authentication key is appropriate.

Further, the processing is different in that the function authentication key issued by the management equipment 3 includes, as shown in FIGS. 8 to 10, at least a device identifier, which is a control target, the number of times of license issuance transmitted by the optical transmission equipment 1 concerning a requested function, a requested function, and a setting flag for instructing which of enabling and disabling is set for the requested function.

(Step 3: Function Setting Step)
(Step 3-1: License Code Transfer Step)

Processing same as Step 3-1 in the first embodiment is performed. However, a function authentication key included in a license code treated in this processing includes: as explained above, at least a device identifier, the number of times of license issuance, a requested function, and a setting flag.

(Step 3-2: Function Authentication Key Application Step)

Figure 13:
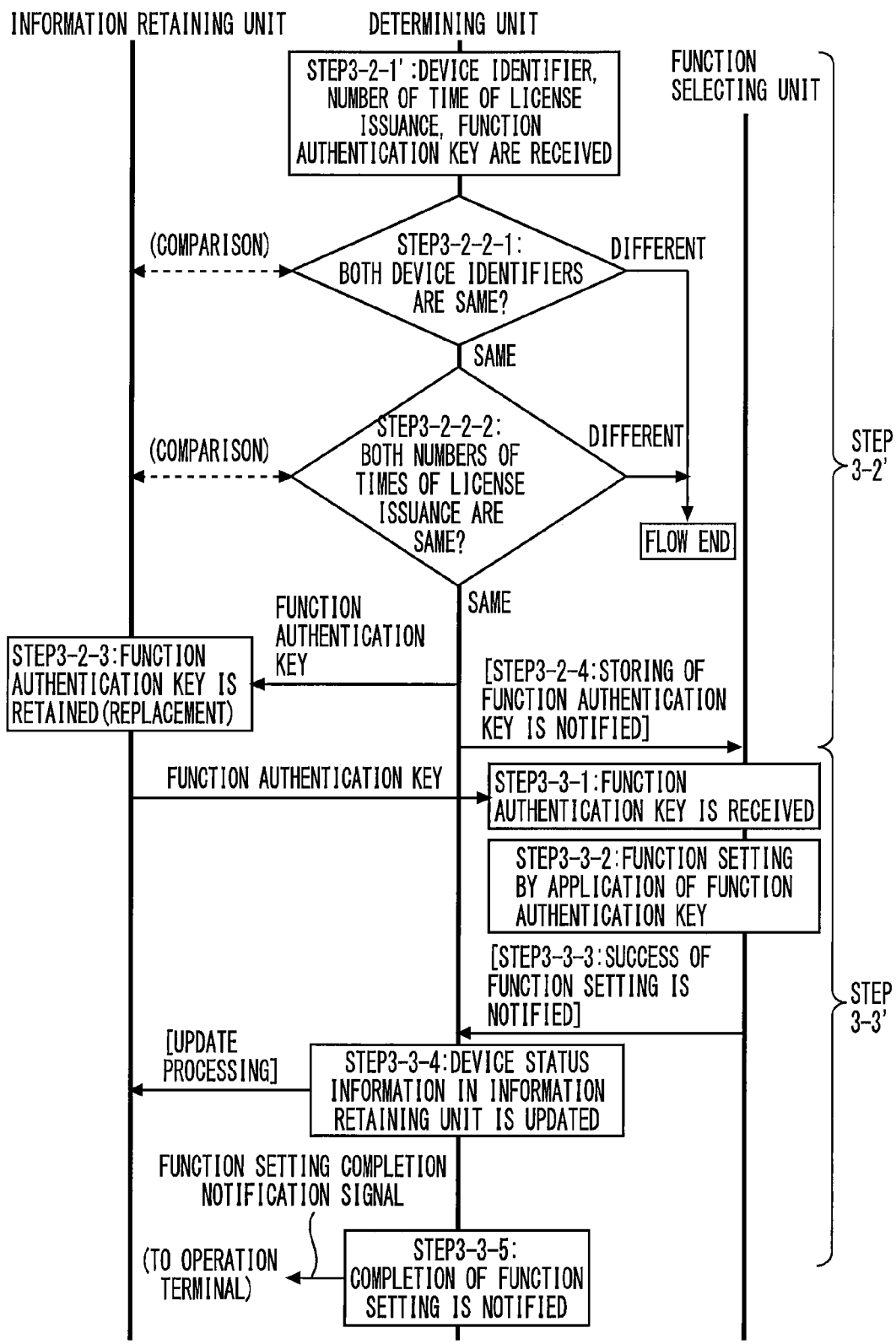
FIG. 13 is a diagram showing processing flows of a function authentication key application step and a requested function enabling step according to the second embodiment of the present invention.

FIG. 13 is a diagram showing processing flows of a function authentication key application step and a requested function enabling step according to the second embodiment of the present invention. In the second embodiment, in order to enable processing of disabling of a function in the optical transmission equipment 1, Step 3-2' in FIG. 13 is adopted instead of Steps 3-2 (Step 3-2-1 to Step 3-2-3) in the first embodiment. Details of Step 3-2' are as explained below.

When the receiving unit of the management interface unit 6 of the optical transmission equipment 1 receives a license code, the license code is sent to the decryption processing unit 20 of the code processing unit 16. The decryption processing unit 20, which receives the license code, decrypts the license code and generates a function authentication key. The decryption processing unit 20 transmits the function authentication key, which is decrypted to be a plain text, to the code separating unit 21. The code separating unit 21 separates and extracts a device identifier and the number of times of license issuance from the received function authentication key and transmits the device identifier, the number of times of license issuance, and the function authentication key to the determining unit 15.

The determining unit 15 first, which receives the device identifier, the number of times of license issuance, and the function authentication key (Step 3-2-1' in FIG. 13), compares the device identifier transferred from the code separating unit 21 and the device identifier retained in the information retaining unit 11 (Step 3-2-2-1). When both the device identifiers coincide with each other, the determining unit 15 determines that a preceding license code is transmitted to the determining unit 15 and proceeds to the next processing. When both the device identifiers are different, the determining unit 15 discards the received function authentication key and ends the determination processing flow.

Subsequently, the determining unit 15 compares the number of times of license issuance transferred from the code separating unit 21 and the number of times of license issuance retained in the information retaining unit 11 (Step 3-2-2-2). When both the numbers of times of license issuance are different, the determining unit 15 determines that a fraudulent function authentication key is transmitted, discards the received function authentication key, and ends the determination processing flow. On the other hand, when both the numbers of times of license issuance coincide with each other, the determining unit 15 determines that a regular function authentication key is sent and proceeds to the next processing.

The determining unit 15 transmits the function authentication key transferred from the code processing unit 16 to the information retaining unit 11 and retains the function authentication key in the information retaining unit 11 (Step 3-2-3). Note that, when a function authentication key in the past concerning the same requested function is already retained in the information retaining unit 11, the determining unit 15 replaces the function authentication key with a new function authentication key. Naturally, if it is only possible to distinguish which one is the latest function authentication key in a certain function, an old key and a new key may be mixed. For example, a function authentication key with the largest number of times of license issuance only has to be determined as the "latest" key. At the same time, the determining unit 15 notifies the function selecting unit 17 that the function authentication key is added to the information retaining unit 11 anew (Step 3-2-4). These are processing same as the processing in the first embodiment.

(Step 3-3: Requested function Enabling Step)

In the second embodiment, Step 3-3' in FIG. 13 is adopted instead of Step 3-3 (Step 3-3-1 to Step 3-3-4) in the first embodiment. Details of Step 3-3' is as explained below.

The function selecting unit 17 accesses the information retaining unit 11 on the basis of the notification from the determining unit 15 and receives all the function authentication keys included in the information retaining unit 11 (Step 3-3-1). The function selecting unit 17 applies the latest key among the received all function authentication keys and enables or disables, on the basis of information concerning the setting flag of the authentication function key, each of the functions designated in the function authentication key (Step 3-3-2). After performing this function setting, the function selecting unit 17 transmits a signal for notifying that the function setting is successful to the determining unit 15 (Step 3-3-3).

The determining unit 15, which receives the notification from the function selecting unit 17, updates a function use state for a function, for which function setting (including both of enabling and disabling) is performed anew, in the device status information retained in the information retaining unit 11 and increases the number of times of license issuance for the function by "1" (Step 3-3-4). The determining unit 15 generates a function setting completion notification signal for notifying the operation terminal 2 that the function designated by the function authentication key is enabled for the digital coherent DSP-LSI 10 and transmits the function setting completion notification signal to the operation terminal 2 via the transmitting unit of the management interface unit 6 (Step 3-3-5).

(Step 4: Operation Termination Step)

Processing same as Step 4 in the first embodiment is performed.

As explained above, in the remote management system according to this embodiment, even after the optical transmission equipment 1, which is the processing equipment, is started to be used, without replacing the digital coherent DSP-LSI 10 in the optical transmission equipment 1, it is possible to enable or disable, with a function authentication key sent from a remote place, a part or all of functions implemented in the LSI. Further, the optical transmission equipment 1 retains the number of times of license issuance and a function authentication key including the number of times of license issuance is used for setting of a function. Therefore, when a disabled function is enabled, it is possible to prevent a fraudulent act of applying, again, a function authentication key issued in the past and enabling a requested function. A reason why the latter effect can be expected is explained with reference to FIGS. 7 to 10.

FIG. 7 shows an example of information in the information retaining unit 11 in an initial state (during a first start) of the optical transmission equipment 1. Since no function is enabled yet, no function authentication key is retained. The number of times of license issuance is "0" in all kinds of device status information.

FIG. 8 shows an example of information in the information retaining unit 11 at the time when the processing shown in FIG. 11 is performed to enable "QPSK demodulation function" after the optical transmission equipment 1 is started first. This state is, for example, a stage in which, after the optical transmission equipment 1 is started, first, this function is used on a trial basis free of charge and performance is evaluated. Since the number of times of license issuance of the "QPSK demodulation function" in FIG. 7 is "0", the number of times of license issuance is "0" for a function authentication key (equivalent to the function authentication key shown in FIG. 8) generated by the management equipment 3 as a result of the processing shown in FIG. 11. Since the function authentication key shown in FIG. 8 is applied, in a field of the "QPSK demodulation function" of the device status information, the function use state is updated to "1" (enabled) and the number of times of license issuance is updated to "1" (a function authentication key of the first time is applied) by the determining unit 15.

FIG. 9 shows an example of information in the information retaining unit 11 at the time when the processing shown in FIG. 11 is performed again to disable the "QPSK demodulation function" after the "QPSK demodulation function" is enabled once. This state is a stage in which, for example, although a certain function is evaluated, it is determined that the function does not need to be used in actual operation, and trial use of the function is cancelled. Since the number of times of license issuance of the "QPSK demodulation function" in FIG. 8 is "1", the number of times of license issuance is "1" for a function authentication key (equivalent to the function authentication key shown in FIG. 9) generated by the management equipment as a result of the processing in FIG. 11. Since the function authentication key shown in FIG. 9 is applied, in a field of the "QPSK demodulation function" of the device status information, the function use state is updated to "0" (disabled) and the number of times of license issuance is updated to "2" (a function authentication key of the second time is applied) by the determining unit 15.

FIG. 10 shows an example of information in the information retaining unit 11 at the time when, after the "QPSK demodulation function" is enabled once and further disabled, the processing shown in FIG. 11 is performed again to enable the "QPSK demodulation function". This state is, for example, a stage in which, when actual operation is performed, since a function considered unnecessary in the beginning is nevertheless necessary, a license of the function is purchased. Since the number of times of license issuance of the "QPSK demodulation function" in FIG. 9 is "2", the number of times of license issuance is "2" for a function authentication key (equivalent to the function authentication key shown in FIG. 10) generated by the management equipment 3 as a result of the processing shown in FIG. 11. Since the function authentication key shown in FIG. 10 is applied, in the field of the "QPSK demodulation function" of the device status information, the function use state is updated to "1" (enabled) and the number of times of license issuance is updated to "3" (a function authentication key of the second time is applied).

It is assumed that the information retaining unit 11 does not retain the number of times of license issuance and the number of times of license issuance is not included in a function authentication key generated as a result of communication between the optical transmission equipment 1 and the management equipment 3. In this case, the function authentication key shown in FIG. 8 (this is equivalent to a "trial use license" in the example explained above) can be easily applied to the optical transmission equipment 1 in which the information shown in FIG. 9 is retained in the information retaining unit 11. As a result, it is possible to enable the "QPSK demodulation function" free of charge.

On the other hand, in this embodiment, the information retaining unit 11 retains the numbers of times of license issuance for the respective functions implemented in the digital coherent DSP-LSI 10 and the function authentication key for giving remote setting of a function to the optical transmission equipment 1 includes the number of times of license issuance. Therefore, even if it is attempted to apply the function authentication key shown in FIG. 8 to the optical transmission equipment 1 in which the information shown in FIG. 9 is retained in the information retaining unit 11, it is possible to discriminate that the function authentication key is a fraudulent function authentication key according to the processing Step 3-2' in FIG. 10. Therefore, it is possible to prevent a fraudulent act of applying a function authentication key issued in the past again to enable the requested function.

The second embodiment discloses the remote management system that targets one optical transmission equipment 1 (processing equipment) on which one digital coherent DSP-LSI 10 is mounted as shown in FIG. 2 and sets a function included in the optical transmission equipment 1 from a remote place. In this embodiment, as in the first embodiment, even after the processing equipment is started to be used, without replacing a device and the like in the processing equipment, it is possible to enable or disable a part or all of the functions of the processing equipment. Further, it is possible to discriminate that the function authentication key is a fraudulent function authentication key. Therefore, it is possible to prevent a fraudulent act of applying a function authentication key issued in the past again to enable a requested function.

Third Embodiment

Unlike the first and second embodiments, a remote management system according to a third embodiment of the present invention targets one optical transmission equipment 1 (processing equipment) on which a plurality of digital coherent DSP-LSIs 10 are mounted and sets a function included in the optical transmission equipment 1 from a remote place. In the third embodiment, it is possible to collectively set (enable or disable) the same function in the plurality of digital coherent DSP-LSI 10 using one function authentication key. Therefore, it is possible to perform more flexible and lower-cost operation of the remote management system.

The configuration of the remote management system according to this embodiment is the same as the configuration shown in FIG. 1 in the first embodiment. The optical transmission equipment 1 (the processing equipment) according to this embodiment may include not only the configuration shown in FIG. 2 in the first embodiment but also a configuration in which a plurality of digital coherent DSP-LSIs 10 are mounted on one optical transmission equipment 1. Further, device information retained in the information retaining unit 11 and the configuration of a function authentication key are different from the device information and the configuration in the first and second embodiments. Specific differences are explained below.

(Configuration of an Optical Transmission Equipment, which is a Processing Equipment)

Figure 14:
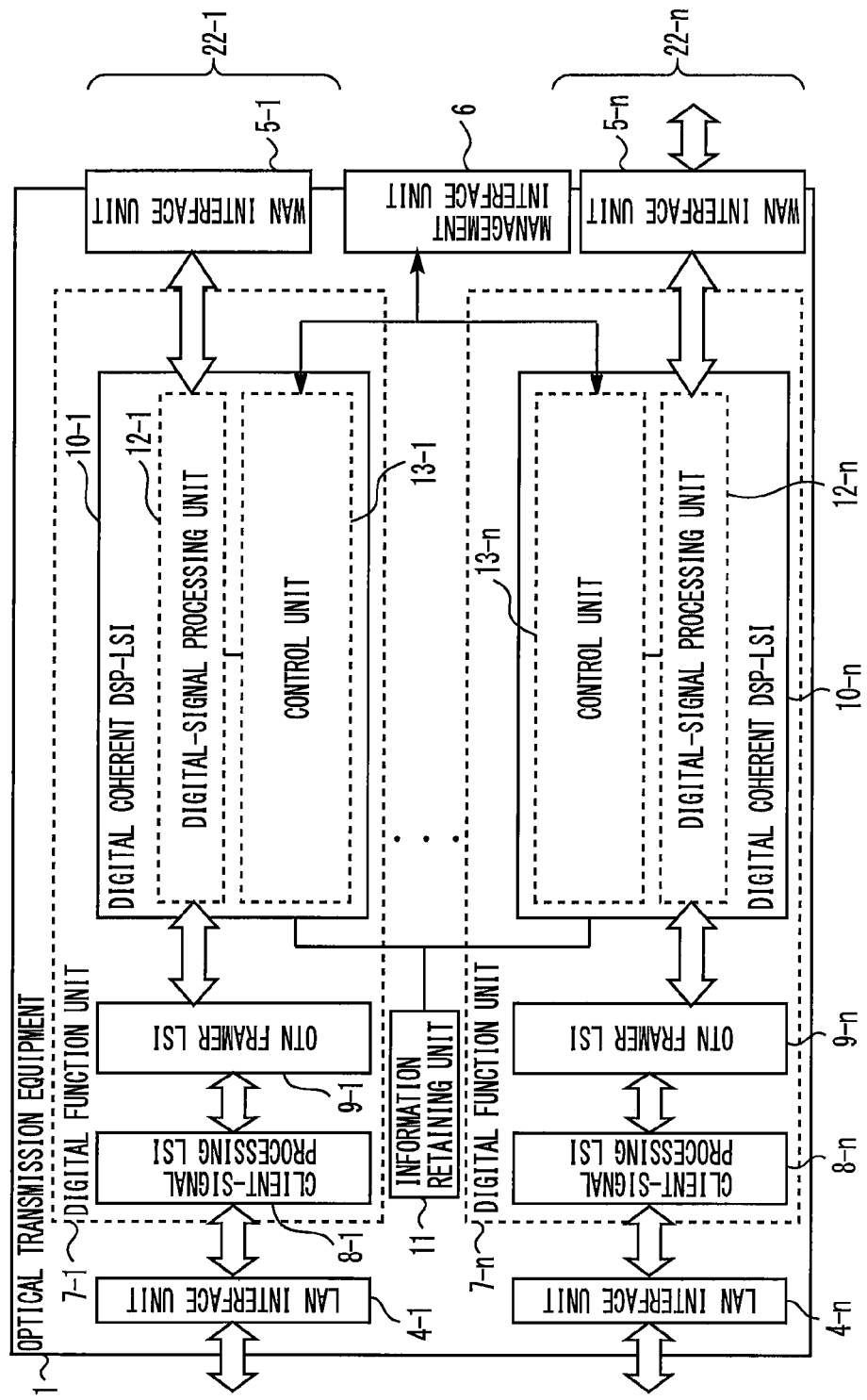
FIG. 14 is a diagram showing an optical transmission equipment according to the third embodiment of the present invention.

FIG. 14 is a diagram showing an optical transmission equipment according to the third embodiment of the present invention. FIG. 15 is a diagram showing information retained in an information retaining unit of the optical transmission equipment according to the third embodiment of the present invention.

In the optical transmission equipment 1 according to this embodiment, a LAN interface unit, a WAN interface unit, and a digital function unit form one optical-transmission processing unit. The optical transmission equipment 1 includes a plurality of optical-transmission processing units 22-1 to 22-n. The optical-transmission processing units 22-1 to 22-n respectively include LAN interface units 4-1 to 4-n, WAN interface units 5-1 to 5-n, and digital function units 7-1 to 7-n. The digital function units 7-1 to 7-n respectively include client-signal processing LSIs 8-1 to 8-n, OTN framer LSIs 9-1 to 9-n, and digital coherent DSP-LSIs 10-1 to 10-n. The digital coherent DSP-LSIs 10-1 to 10-n respectively include digital-signal processing units 12-1 to 12-n and control units 13-1 to 13-n. The configurations and the connection form of these digital function units are the same as the configurations and the connection form in the first embodiment. Detailed explanation of the configurations and the connection form is omitted.

Note that, in the first embodiment, as the configuration of the digital-signal processing unit 12 and the control unit 13 of the digital coherent DSP-LSI 10, a configuration is illustrated in which the digital-signal processing unit 12 is a network processor capable of performing hardware processing and the control unit 13 is the general-purpose processor (and the control software for executing the function of the control unit 13) electrically connected to the network processor. In this embodiment, as in the first embodiment, such a configuration example can be adopted. In this case, unlike the configuration shown in FIG. 14, one control unit (general-purpose processor or the like) is physically provided with respect to one optical transmission equipment 1. The one control unit individually controls each of the digital coherent DSP-LSIs 10-1 to 10-n.

The optical transmission equipment 1 according to this embodiment further includes the management interface unit 6 and the information retaining unit 11 shared by the plurality of optical-transmission processing units 22-1 to 22-n. The configurations of the management interface unit 6 and the information retaining unit 11 are the same as the configurations in the first embodiment. The management interface unit 6 is connected to the control units 13-1 to 13-n respectively included in the digital coherent DSP-LSIs 10-1 to 10-n. The management interface unit 6 is a shared input/output interface for the plurality of control units 13-1 to 13-n to transmit and receive various signals communicated to the operation terminal 2. The information retaining unit 11 is connected to the control units 13-1 to 13-n respectively included the digital coherent DSP-LSIs 10-1 to 10-n, shared by the plurality of digital coherent DSP-LSIs 10-1 to 10-n, and retain device identifiers, device information, function authentication keys, and the like concerning the respective digital coherent DSP-LSIs 10-1 to 10-n.

As shown in FIG. 15, at least device information and function authentication keys are retained in the information retaining unit 11. The device information includes at least device identifiers, device status information, and license information. The device identifier is identifier (ID) information uniquely allocated to one digital coherent DSP-LSI. The information retaining unit 11 is different from the first and second embodiments in that device identifiers for all the digital coherent DSP-LSIs 10-1 to 10-n (hereinafter referred to as control target digital coherent DSP-LSIs) that are included in the optical transmission equipment 1 and for which it is desired to cause setting of enabling/disabling of already implemented functions to function are retained in the information retaining unit 11. Note that, in FIG. 15, the device identifiers are represented as "DSP-1, DSP-2, . . . , and DSP-n" (n is a positive number).

The device status information includes at least functions already implemented in the control target digital coherent DSP-LSIs 10-1 to 10-n at a point in time of manufacturing (hereinafter referred to as implemented functions) and combinations of the functions and present states of use (enabled or disabled). In FIG. 15, "0" indicates an ineffective (disabled) state and "1" indicates an effective (enabled) state. In the information retaining unit 11 according to this embodiment, device status information for all the control target digital coherent DSP-LSIs 10-1 to 10-n is retained.

The license information includes at least information concerning the number of times of license issuance and a license application destination for each of all the functions (implemented functions) implemented in the control target digital coherent DSP-LSIs 10-1 to 10-n included in one optical transmission equipment 1. These kinds of license information are particularly useful information in this embodiment.

The number of times of license issuance is information meaning a total number of function authentication keys issued to that point to each of the implemented functions and applied to the optical transmission equipment 1. The license application destination is information for specifying the control target digital coherent DSP-LSI, the function of which is enabled at the present point in time, with respect to each of the implemented functions. For example, as shown in FIG. 15, the license application destination includes a device identifier of the enabled control target digital coherent DSP-LSI. Note that description "(null)" in the information concerning the license application destination in FIG. 15 means that a relevant function is not enabled in all the control target digital coherent DSP-LSIs.

As shown in FIG. 15, the device status information is prepared for each of the respective control target digital coherent DSP-LSIs 10-1 to 10-n. One set of the license information is prepared for all the control target digital coherent DSP-LSIs 10-1 to 10-n.

The function authentication keys include at least device identifiers, target functions, and information concerning the numbers of effective licenses of all the control target digital coherent DSP-LSIs 10-1 to 10-n mounted on the optical transmission equipment 1. The number of effective licenses indicates a maximum number of the control target digital coherent DSP-LSIs, specific functions of which can be enabled, in one optical transmission equipment 1. The number of effective licenses is particularly useful information in this embodiment. If a function authentication key, the number of effective licenses of which is described as "2", is applied, irrespective of the number of the control target digital coherent DSP-LSIs mounted on one optical transmission equipment 1, it is possible to enable up to two control target digital coherent DSP-LSIs concerning a requested function. Note that, when it is desired to perform disabling of a function as well, as explained in the second embodiment, the number of times of license issuance only has to be included as well. However, the setting flag does not always need to be provided because the number of effective licenses "0" is equivalent to disabling of target functions in all the digital coherent DSP-LSIs 10.

(Explanation of Processing by the Remote Management System)

Figure 16:
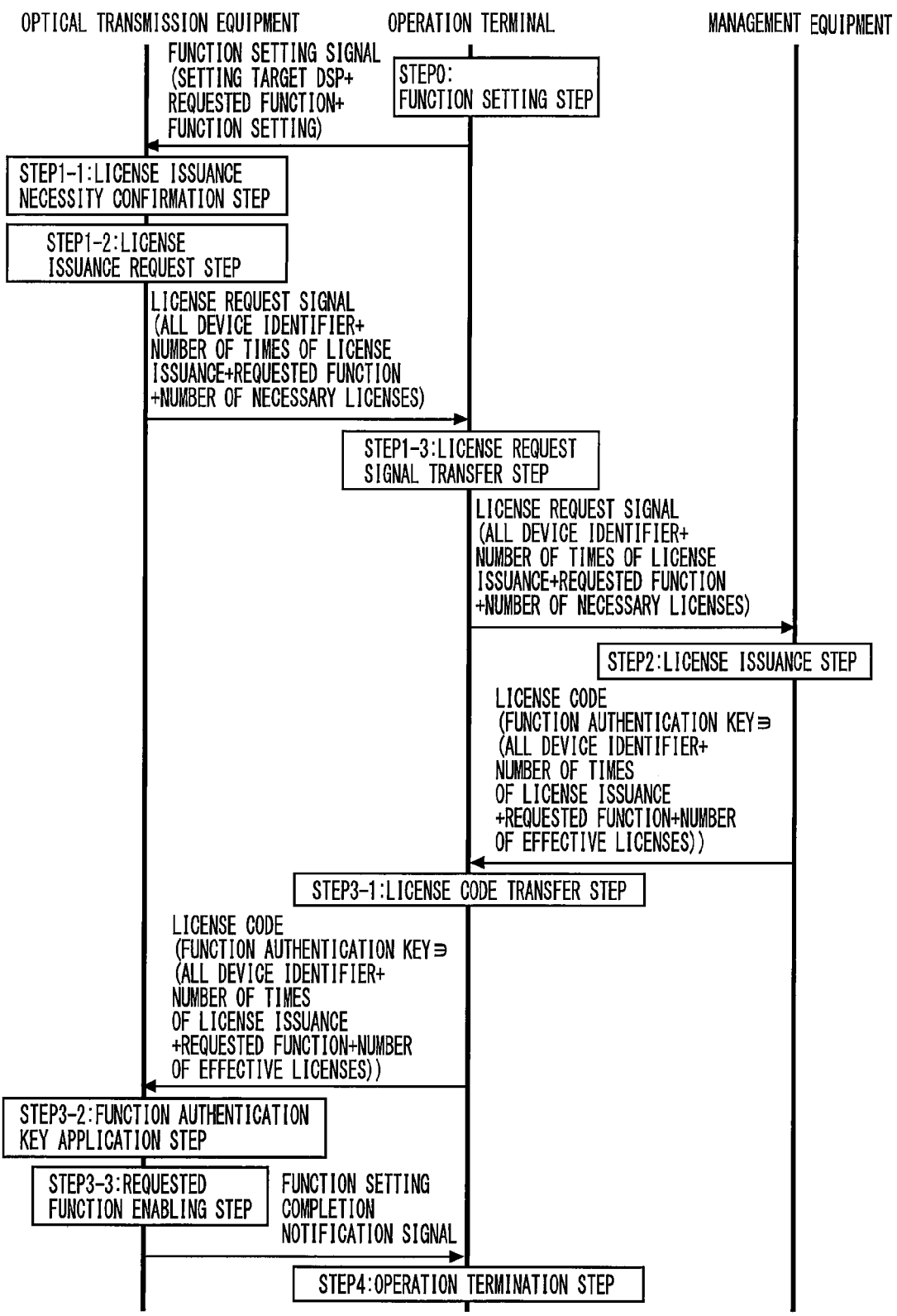
FIG. 16 is a diagram showing a processing flow of the remote management system according to the third embodiment of the present invention.

A processing flow of the remote management system according to this embodiment is the same as FIG. 4 in the first embodiment and FIG. 11 in the second embodiment. However, signals communicated among the devices and the terminals are different from the signals in the first and second embodiments. In the following explanation, processing by the remote management system according to this embodiment is explained in detail with reference to the drawings. FIG. 16 is a diagram showing a processing flow of the remote management system according to the third embodiment of the present invention.

(Step 0: Function Setting Step)

The operation terminal 2 specifies, according to operation by the operator, the control target digital coherent DSP-LSIs, functions of which are desired to be set (controlled to be enabled or disabled), (hereinafter referred to as setting target digital coherent DSP-LSIs) among the control target digital coherent DSP-LSIs 10-1 to 10-n of the optical transmission equipment 1 connected to the operation terminal 2 and functions desired to be enabled or disabled (hereinafter referred to as requested functions) among the functions implemented in the control target digital coherent DSP-LSIs and transmits a function setting signal including information concerning the setting target digital coherent DSP-LSIs, the requested functions, and function setting information for instructing to enable or disable the requested functions to the optical transmission equipment 1.

The operation terminal 2 designates a plurality of setting target digital coherent DSP-LSIs with respect to a certain requested function and instructs, using a function setting signal, the optical transmission equipment 1 to perform enabling or disabling of the requested function for the plurality of setting target digital coherent DSP-LSIs. The management interface unit 6 of the optical transmission equipment 1 receives the function setting signal. In this case, information concerning the plurality of setting target digital coherent DSP-LSIs may be included in one function setting signal and transmitted to the optical transmission equipment 1 or a plurality of function setting signals respectively corresponding to the plurality of setting target digital coherent DSP-LSIs may be transmitted. A format example of the function setting signal in the case in which the former implementation form is adopted is shown in Table 2.

TABLE 2

| Setting target digital coherent DSP-LSI | Requested function | Function setting |
|---|---|---|
| DSP-1 | QPSK demodulation | Effective |
| DSP-2 | | Effective |
| DSP-3 | | Ineffective |

In the table, an example of a function setting signal for instructing to set DSP-1 and DSP-2 to be enabled and DSP-3 to be disabled with respect to the "QPSK demodulation" function is shown. In this way, with the same requested function, it is also possible to mix function settings of enabling and disabling with respect to the plurality of setting target digital coherent DSP-LSIs.

(Step 1: License Request Step)

(Step 1-1: License Issuance Necessity Confirmation Step

Figure 17:
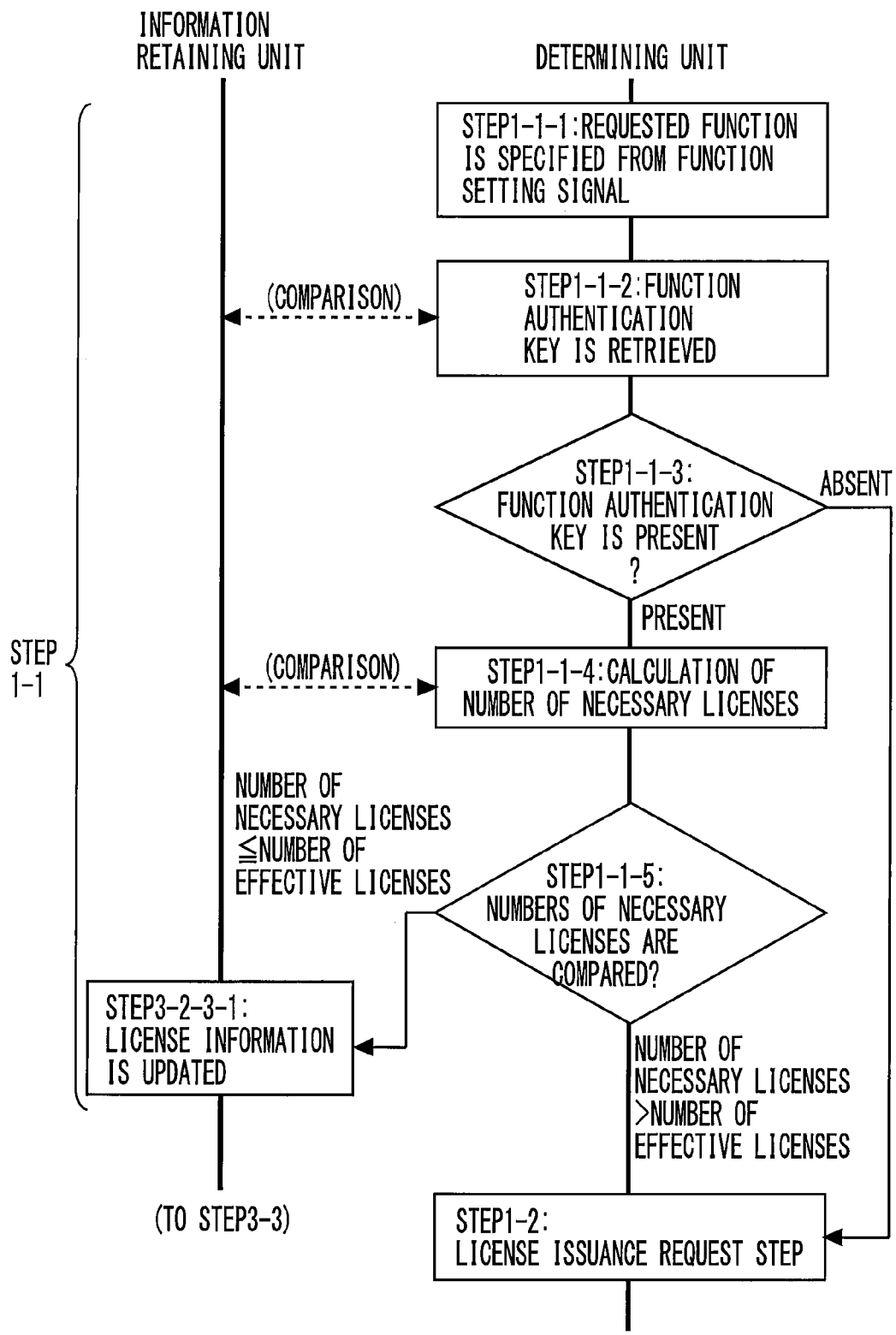
FIG. 17 is a diagram showing a processing flow of a license issuance necessity confirmation step according to the third embodiment of the present invention.

FIG. 17 is a diagram showing a processing flow of a license issuance necessity confirmation step according to the third embodiment of the present invention. The management interface unit 6 of the optical transmission equipment 1 sends the received function setting signal to the control units 13-1 to 13-n of all the control target digital coherent DSP-LSIs 10-1 to 10-n.

Thereafter, the control unit 13-1 of the digital coherent DSP-LSI 10-1 mainly carries out processing related to function setting. However, when the control units 13-1 to 13-n are respectively included in the digital coherent DSP-LSIs 10-1 to 10-n as shown in FIG. 14, any one of the plurality of control units 13-1 to 13-n needs to be designed to take the lead in the processing of the function setting. Therefore, for example, the control unit 13-1 of the digital coherent DSP-LSI 10-1 corresponding to the setting target digital coherent DSP-LSI having a smallest value of a device identifier among the setting target digital coherent DSP-LSIs included in the function setting signal only has to be set as a control unit that takes the lead in the processing related to the function setting (hereinafter referred to as leading control unit). Naturally, a method of selecting the leading control unit is not limited to this. Note that, when one control unit 13 is shared by the plurality of digital coherent DSP-LSIs 10 as explained in the first embodiment, the shared control unit 13 performs all kinds of processing related to the function setting. Therefore, it is unnecessary to select any one control unit 13.

In all the control units 13-1 to 13-n, the received function setting signal is sent to the determining units 15 included in the control units 13-1 to 13-n. The determining units 15 respectively decode the received function setting signal according to necessity and determine according to a predetermined algorithm whether the determining units 15 should be the leading control unit (Step 1-1-0, not shown in the drawing).

The determining unit 15 of the control unit 13-1 set as the leading control unit specifies, from the received function setting signal, a requested function and a setting instruction to the setting target digital coherent DSP-LSIs (Step 1-1-1). The determining unit 15 accesses the information retaining unit 11 and retrieves a function authentication key related to the specified requested function (Step 1-1-2) and confirms whether the relevant function authentication key is present in the information retaining unit 11 (Step 1-1-3). When the function authentication key related to the requested function is absent in the information retaining unit 11, the determining unit 15 determines that it is necessary to request a function authentication key anew and processes the next step Step 1-2.

On the other hand, when the function authentication key related to the requested function is present in the information retaining unit 11, the determining unit 15 processes a calculation step for the "number of necessary licenses" (Step 1-1-4). In this step, the determining unit 15 calculates the number of the control target digital coherent DSP-LSIs enabled when the optical transmission equipment 1 is set on the basis of the function setting signal (hereinafter referred to as number of necessary licenses).

FIG. 18 is a diagram showing processing of the calculation step for the number of necessary licenses according to the third embodiment of the present invention. First, the determining unit 15 confirms, from information of the received function setting signal, which setting target digital coherent DSP-LSI is enabled or disabled as shown in a right table of FIG. 18. Subsequently, the determining unit 15 accesses the information retaining unit 11 and confirms, from the device information and the information concerning the function authentication key retained in the information retaining unit 11, states of use of the requested function in all the control target digital coherent DSP-LSIs 10-1 to 10-$n$ and information concerning the number of effective licenses, shown in a left table of FIG. 18. The determining unit 15 overwrites information of the left table of FIG. 18 with information of the right table of FIG. 18. From a result of the overwriting, the number of the control target digital coherent DSP-LSIs that use the requested function, that is, the number of necessary licenses in the case in which the optical transmission equipment 1 is set on the basis of the function setting signal, is determined. In the example shown in FIG. 18, as shown in a bottom table, DSPs-1, 2, and 4 are effective and DSP-3 and 5 are ineffective. Therefore, the number of necessary licenses is "3".

Subsequently, the determining unit 15 compares the number of necessary licenses calculated in Step 1-1-4 and the number of effective licenses obtained from the function authentication key retained in the information retaining unit 11 (Step 1-1-5). When (the number of necessary licenses)> (the number of effective licenses), the determining unit 15 determines that it is necessary to request a function authentication key anew and transitions to the next step Step 1-2. On the other hand, when (the number of necessary licenses) (the number of effective licenses), the determining unit 15 determines that it is unnecessary to request a function authentication key anew, transitions to Step 3-2-3-1 explained below, updates the license information, and transitions to a requested function enabling step Step 3-3.

(Step 1-2: License Issuance Request Step)

The determining unit 15 of the leading control unit acquires, from the information retaining unit 11, all the device identifiers concerning the control target digital coherent DSP-LSIs 10-1 to 10-$n$ mounted on the optical transmission equipment 1 and the number of times of license issuance to the requested function. Further, the determining unit 15 sends the information concerning the requested function specified from the function setting signal and the number of necessary licenses calculated in Step 1-1-4 to the code processing unit 16 in addition to the device identifiers and the number of times of license issuance acquired from the information retaining unit 11 and instructs the code processing unit 16 to generate a license request signal including these kinds of information.

The code processing unit 16, which receives the instruction of the determining unit 15 in the leading control unit, creates a license request signal for requesting the management equipment 3 to issue a function authentication key as in Step 1-2 in the first and second embodiments and transmits the license request signal to the operation terminal 2 via the management interface unit 6. Since the license request signal includes the number of necessary licenses, the determining unit 15 requests the management equipment 3 to increase the number of effective licenses to the number of necessary licenses.

(Step 1-3: License Request Signal Transfer Step)

The operation terminal 2, which receives the license request signal, transfers the license request signal to the management equipment 3 as in Step 1-3 in the first and second embodiments.

(Step 2: License Issuance Step)

The management equipment 3, which receives the license request signal, decodes all the device identifiers, the requested function, the number of times of license issuance, and the number of necessary licenses from the license request signal as in Step 2 in the first and second embodiments.

The management equipment 3 verifies appropriateness of enabling the requested function by the number of necessary licenses for the digital coherent DSP-LSIs 10 corresponding to the decoded device identifiers.

As a result of the verification, when it is determined that it is appropriate to enable the requested function by the number of necessary licenses, the management equipment 3 issues a function authentication key for remotely setting the requested function. The issued function authentication key is retained in a license code, which is a signal format for transmission to the optical transmission equipment 1, and transmitted to the operation terminal 2.

The function authentication key includes, as shown in FIG. 15, all the device identifiers of all the control target digital coherent DSP-LSIs 10-1 to 10-$n$ mounted on the optical transmission equipment 1, the number of times of license issuance decoded from the license request signal, the requested function, and the number of effective licenses that should be given to the optical transmission equipment 1.

The number of effective licenses is set to, for example, the number of necessary licenses decoded from the license request signal. Consequently, it is possible to enable the requested function of the digital coherent DSP-LSI 10 by a number desired by a customer of the optical transmission equipment 1. It is also conceivable to set the number of necessary licenses corresponding to a payment amount of the customer on the basis of billing information. Further, when it is desired to disable the requested function for all the control target digital coherent DSP-LSIs 10-1 to 10-$n$, the number of necessary licenses only has to be set to "0".

(Step 3: Function Setting Step)
(Step 3-1: License Code Transfer Step)

The operation terminal 2, which receives the license code, transfers the license code to the optical transmission equipment 1 connected to the operation terminal 2 as in Step 3-1 in the first and second embodiments.

(Step 3-2: Function Authentication Key Application Step)

Figure 19:
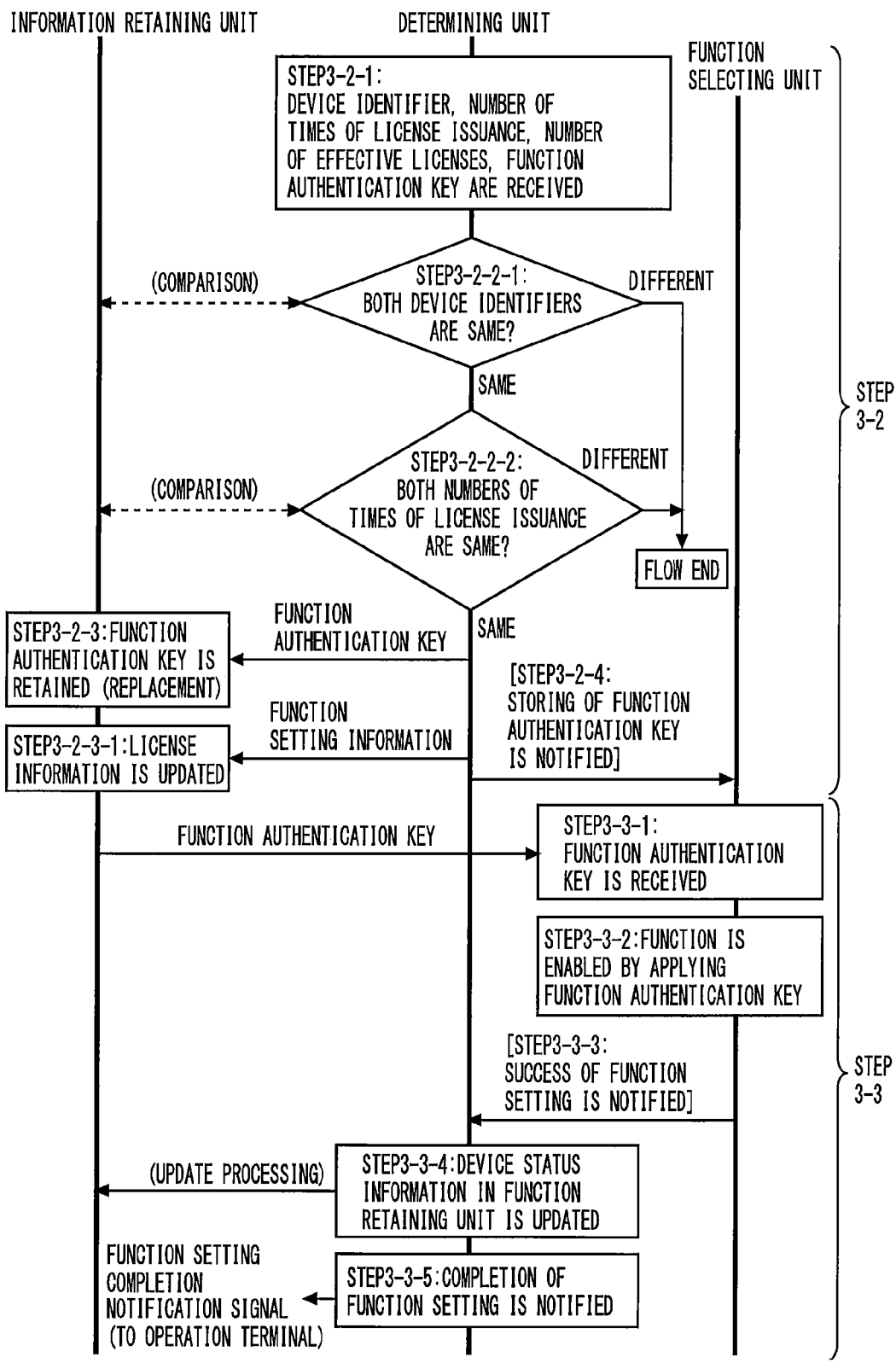
FIG. 19 is a diagram showing processing flows of a function authentication key application step and a requested function enabling step according to the third embodiment of the present invention.

FIG. 19 is a diagram showing processing flows of a function authentication key application step and a requested function enabling step according to the third embodiment of the present invention. When the receiving unit of the management interface unit 6 of the optical transmission equipment 1 receives the license code, the license code is sent to the control units 13-1 to 13-$n$ of all the control target digital coherent DSP-LSIs 10-1 to 10-$n$. Any one control unit is set as the leading control unit according to the processing in Step 1-1-0 explained above.

In the determining unit 15 of the leading control unit, the received license code is sent to the decryption processing unit 20. The decryption processing unit 20 decrypts the license code and generates a function authentication key. The decryption processing unit 20 transmits the function authentication key, which is decrypted to be a plain text, to the code separating unit 21.

The code separating unit 21 separates and extracts all the device identifiers, the number of times of license issuance, and the number of effective licenses from the received function authentication key and transmits the device identifiers, the number of times of license issuance, the number of effective licenses, and the function authentication key to the determining unit 15.

The determining unit 15, which receives all the device identifiers, the number of times of license issuance, the number of effective licenses, and the function authentication key (Step 3-2-1), compares all the device identifiers transferred from the code separating unit 21 and all the device identifiers retained in the information retaining unit 11 (Step 3-2-2-1). When all the device identifiers coincide with each other, the determining unit 15 determines that a preceding license code is transmitted to the determining unit 15 and proceeds to the next processing. When both the device identifiers are different, the determining unit 15 discards the received function authentication key and ends the determination processing flow.

Subsequently, the determining unit 15 compares the number of times of license issuance transferred from the code separating unit 21 and the number of times of license issuance retained in the information retaining unit 11 (Step 3-2-2-2). When both the numbers of times of license issuance are different, the determining unit 15 determines that a fraudulent function authentication key is sent, discards the received function authentication key, and ends the determination processing flow. On the other hand, when both the numbers of times of license issuance coincide with each other, the determining unit 15 determines that a regular function authentication key is sent and proceeds to the next processing.

The determining unit 15 transmits the function authentication key transferred from the code processing unit 16 to the information retaining unit 11 and retains the function authentication key in the information retaining unit 11 (Step 3-2-3). Note that, when a function authentication key in the past concerning the same requested function is already retained in the information retaining unit 11, the determining unit 15 replaces the function authentication key with a new function authentication key. Naturally, if it is only possible to distinguish which one is the latest function authentication key in a certain function, an old key and a new key may be mixed. For example, a function authentication key with the largest number of times of license issuance only has to be determined as the "latest" key.

At the same time, the determining unit 15 overwrites and updates the information concerning the license application destination in the license information retained in the information retaining unit 11 with the function setting information retained in the function setting signal (Step 3-2-3-1). FIG. 20 is a diagram showing transition of information retained in the information retaining unit according to the third embodiment of the present invention. When the example used in the explanation of the license issuance necessity confirmation step (Step 1-1) in this embodiment is adopted again for explanation, the device information retained in the information retaining unit 11 at a point in time before the processing in Step 3-2-3-1 (this is the same as a state before the execution of the processing flow) is in a state shown in FIG. 20(a) if a format is rewritten. That is, DSPs-3 and 4 are enabled. In the processing in Step 3-2-3-1, information concerning license application destinations for the DSPs-1, 2 and 3 is rewritten from "0, 0, 1" to "1, 1, 0" according to the function setting signal shown in FIG. 14. On the other hand, the DSPs-4 and 5 are maintained as they are. As a result, the device information changes to a state shown in FIG. 20(b).

After the processing in Step 3-2-3-1, the determining unit 15 of the leading control unit notifies the function selecting unit 17 included in the determining unit 15 and the function selecting units 17 in the other all control units that the function authentication key is added to the information retaining unit 11 anew (Step 3-2-4).

(Step 3-3: Requested Function Enabling Step)

All the function selecting units 17 access the information retaining unit 11 on the basis of the notification from the determining unit 15 of the leading control unit and refer to license application destinations corresponding to device identifiers of the function selecting units 17 in the license information. If the function selecting units 17 are designated as the license application destinations (e.g., DPSs 1, 2, and 4 in the case of FIG. 20(b)), the function selecting units 17 receive the function authentication key included in the information retaining unit 11
(Step 3-3-1).

The function selecting unit 17, which receives the function authentication key, applies the received function authentication key and enables a function designated in the function authentication key (Step 3-3-2). On the other hand, the function selecting unit 17, which does not receive the function authentication key, disables the function. After performing the function setting explained above, the function selecting unit 17 transmits a signal for notifying that the function setting is successful to the determining unit 15 (Step 3-3-3).

The determining unit 15, which receives the notification from the function selecting unit 17, updates a function use state for a function for which function setting (including both of enabling and disabling) is performed anew in the device status information retained in the information retaining unit 11 and increases the number of times of license issuance to the function by "1" (Step 3-3-4). According to this step, the device information in the information retaining unit 11 changes to a state shown in FIG. 20(c).

The determining unit 15 generates a function setting completion notification signal for notifying the operation terminal 2 that the function designated by the function authentication key is enabled for the digital coherent DSP-LSI 10 and transmits the function setting completion notification signal to the operation terminal 2 via the transmitting unit of the management interface unit 6 (Step 3-3-5).

(Step 4: Operation Termination Step)

Processing same as Step 4 in the first and second embodiments is performed.

As explained above, as in the first embodiment, in the remote management system according to this embodiment, even after the processing equipment is started to be used, without replacing the device and the like in the processing, it is possible to enable or disable a part or all of the functions of the processing equipment. Further, it is possible to collectively set (enable or disable) the same function in the plurality of digital coherent DSP-LSIs 10-1 to 10-n using one function authentication key. Therefore, it is possible to perform more flexible and lower-cost operation of the remote management system.

When the processing equipment is the optical transmission equipment 1, a hot swappable optical transceiver is sometimes used as the WAN interface unit 5. It is assumed that, in the optical transmission equipment 1, the optical transceiver used in a slot 1 (to which the digital function unit 7-1 shown in FIG. 14 is connected) is re-inserted into a slot n because of some reason in service provision. The optical transmission equipment 1 already has a license for using the "QPSK demodulation" function in the digital coherent DSP- LSI 10-1 corresponding to the slot 1. However, if the license is not provided to the slot n, a license is necessary in order to enable the "QPSK demodulation" function in the digital coherent DSP-LSI 10-n corresponding to the slot n anew.

However, in this embodiment, in the license issuance necessity confirmation step (Step 1-1) shown in FIG. 17, a desired "number of necessary licenses" and an already retained "number of effective licenses" are compared. If "the number of necessary licenses the number of effective licenses", it is determined that it is unnecessary to issue a license anew. Therefore, in the case of the assumption example, it is unnecessary to request an additional license.

Fourth Embodiment

In the first to third embodiments, the example of the processing flow for enabling or disabling a specific function implemented in the digital coherent DSP-LSI 10 of the optical transmission equipment 1 with the instruction of the operation terminal 2 as a trigger is explained. However, the present invention is not limited to this and can be applied to processing flows of various forms. For example, when optical transmission equipment 1 is started in a state in which a function authentication key generated by the management equipment 3 is stored in the information retaining unit 11 in advance, the optical transmission equipment 1 only has to start the processing flow from the function authentication key application step of Step 3-2.

The optical transmission equipment 1 retains, in a non-volatile memory, in advance, a setting file in which functions that the optical transmission equipment 1 should enable or disable are summarized. When the optical transmission equipment 1 is started, first, the determining unit 15 in the digital coherent DSP-LSI 10 of the optical transmission equipment 1 reads the setting file and grasps which function should be enabled or disabled. Subsequently, the determining unit 15 starts the processing in Step 3-2. However, in Step 3-2, the determining unit 15 performs, instead of the step of Step 3-2-1, processing for acquiring, from the information retaining unit 11, a function authentication key corresponding to the function that should be enabled or disabled. The determining unit 15 processes Step 3-2-2 and subsequent steps.

Fifth Embodiment

In the fourth embodiment, the example of the processing flow in the case in which the optical transmission equipment 1 is started in the state in which the function authentication key generated by the management equipment 3 is retained in the information retaining unit 11 in advance is explained. However, for example, when the optical transmission equipment 1 is in an initial state immediately after purchase, no function authentication key is retained in the information retaining unit 11. When a need for temporarily using the device in verification, demonstration, or the like occurs, no measure can be taken. To take measures for the need, a mechanism only has to be adopted to enable the optical transmission equipment 1 to use all functions on a trial basis immediately after being started in the initial state but automatically disable the functions after a predetermined time period and, when the functions are continuously used, retain a function authentication key in the optical transmission equipment 1 and enabling the functions. In the following explanation, a state in which all the functions can be used without a function authentication for the predetermined time period after the start from the initial state is referred to as "time limit mode". An example of a processing flow in this time limit mode is explained.

Figure 21:
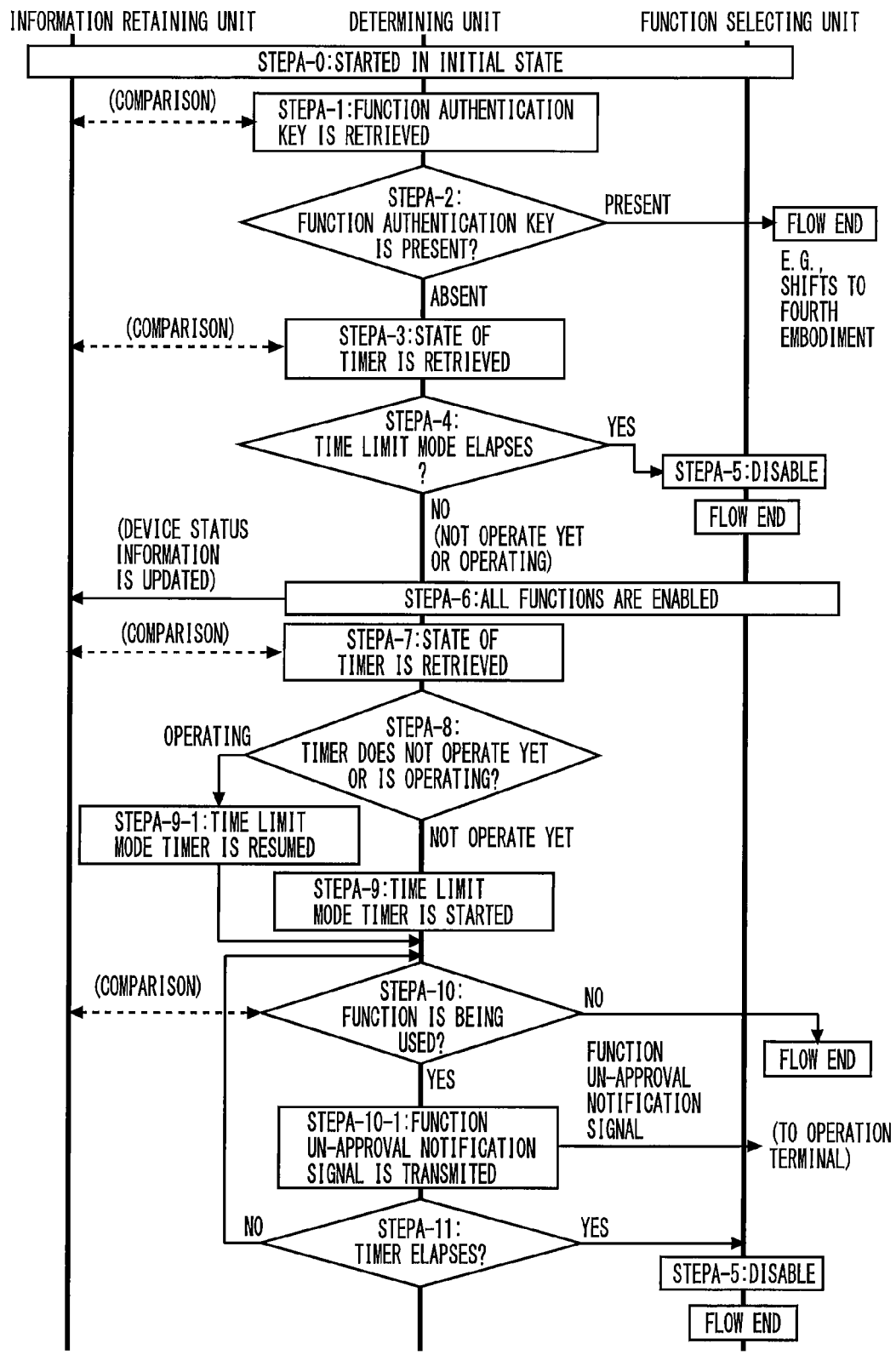
FIG. 21 is a diagram showing a processing flow in the time limit mode of the remote management system according to the fifth embodiment of the present invention.

FIG. 21 is a diagram showing a processing flow in the time limit mode of the remote management system according to the fifth embodiment of the present invention. Note that the configurations of the remote management system and the devices (the optical transmission equipment 1, the operation terminal 2, and the management equipment 3) configuring the remote management system are the same as the configurations in the first to third embodiments.

Simultaneously with the start of the optical transmission equipment 1 in the initial state, the information retaining unit 11, the determining unit 15, and the function selecting unit 17 of the optical transmission equipment 1 are started (Step A-0). The determining unit 15 accesses the information retaining unit 11 and retrieves all function authentication keys corresponding to the implemented functions (Step A-1).

When a function authentication key is present in a certain function, the determining unit 15 ends, for the function, a flow for processing the time limit mode and enters a normal mode (e.g., shifts to the fourth embodiment) (Step A-2). On the other hand, when a function authentication key is absent in a certain function, the determining unit 15 proceeds to the next Step A-3. The determining unit 15 accesses the information retaining unit 11 and retrieves a state of a timer for measuring a time period operable as the time limit mode (Step A-3).

When the timer does not exceed the predetermined time period set in advance, the determining unit 15 determines that the optical transmission equipment 1 is still operated in the time limit mode and proceeds to the next Step A-6 (Step A-4). On the other hand, when the timer exceeds the predetermined time period, the determining unit 15 determines that the time limit mode ends, instructs the function selecting unit 17 to disable a relevant function (Step A-5), and ends the flow.

The determining unit 15 instructs the function selecting unit 17 to enable all the functions implemented in the digital coherent DSP-LSI 10 (Step A-6). The determining unit 15 updates a function use state for all the functions in the device status information retained in the information retaining unit 11 to "1" (enabled). Consequently, the optical transmission equipment 1 is capable of using all the implemented functions.

The determining unit 15 accesses the information retaining unit 11 and retrieves a state of the timer (Step A-7). When the timer does not operate yet, the determining unit 15 proceeds to the next Step A-9 (Step A-8). On the other hand, when the timer is operating, the determining unit 15 proceeds to Step A-9-1. The determining unit 15 starts a timer for defining a time period operable as the time limit mode and proceeds to Step A-10 (Step A-9). The determining unit 15 resumes the timer for defining the time period operable as the time limit mode and proceeds to Step A-10 (Step A-9-1).

The determining unit 15 accesses the information retaining unit 11, refers to a function use state concerning a function for which a function authentication key is absent, and confirms whether the function is being used (Step A-10). When the function is being used, the determining unit 15 determines that the function is in a state of trial use and transmits, to the operation terminal 2, a function un-approval notification signal for urging issuance of a license for the function (Step A-10-1). On the other hand, when it is confirmed that the function is not used, the determining unit 15 determines that the trial use of the function is stopped, ends the flow for processing the time limit mode concerning the function, and enters the normal mode (e.g., shifts to the fourth embodiment).

The determining unit 15 confirms whether the timer started in Step A-9 or A-9-1 exceeds the predetermined time period set in advance (Step A-11). When the timer does not exceed the predetermined time period, the determining unit 15 determines that the optical transmission equipment 1 is still in the time limit mode and returns to Step A-10 again. On the other hand, when the timer exceeds the predetermined time period, the determining unit 15 determines that the time limit mode ends and instructs the function selecting unit 17 to disable a relevant function. The function selecting unit 17 disables the function (Step A-5) and ends the flow for processing the time limit mode.

Note that, the time limit mode described in the fifth embodiment is implemented, for example, the optical transmission equipment 1 may include a function of notifying an alarm from the optical transmission equipment 1 to the operation terminal 2 such that the optical transmission equipment 1 can warn the operator that the optical transmission equipment 1 is in the time limit mode.

In the flow explained above, a procedure for forcibly disabling the function in Step A-5 when the time limit mode elapses is explained. However, the present invention is not limited to this. For example, the entire optical transmission equipment 1 may be forcibly restarted. In any case, in Step A-5, the optical transmission equipment 1 only has to be prevented from being appropriately used in a state in which the optical transmission equipment 1 does not retain a necessary function authentication key.

REFERENCE SIGNS LIST 1 optical transmission equipment; 2 operation terminal; 3 management equipment; 4,4-1—4-$n$ LAN interface unit; 5,5-1~5-$n$ WAN interface unit; 6 management interface unit; 7,7-1~7-$n$ digital function unit; 8,8-1~8-$n$ client-signal processing LSI; 9,9-1~9-$n$ OTN framer LSI; 10,10-1~10-$n$ digital coherent DSP-LSI; 11 information retaining unit; 12,12-1~12-$n$ digital-signal processing unit; 13,13-1~13-$n$ control unit; 14 device-identifier retaining unit; 15 determining unit; 16 code processing unit; 17 function selecting unit; 18 code generating unit; 19 encryption processing unit; 20 decryption processing unit; 21 code separating unit; 22-1~22-$n$ optical-transmission processing unit

The invention claimed is:

1. A processing equipment comprising:
at least one processing circuitry comprising a plurality of functions;
a memory;
interface circuitry configured to communicate with an external device; and control circuitry,
wherein when a signal for setting a specific function among the plurality of functions to be enabled or disabled is received from the external device via the interface circuitry, the control circuitry creates a license request signal for requesting a management equipment to issue a function authentication key for setting the specific function to be enabled or disabled, and conceals the license request signal so that a content of the license request signal cannot be grasped except by the management equipment, and transmits the license request signal to the external device via the interface circuitry, and when the function authentication key issued by the management equipment is received from the external device via the interface circuitry, the memory retains the function authentication key and the control circuitry sets the specific function to be enabled or disabled according to the function authentication key,
the processing equipment includes the at least one processing circuitry, each of the at least one processing circuitry has the plurality of functions,
the function authentication key is configured to include a number of effective licenses which indicates a maximum number of the at least one processing circuitry configured to respectively enable the plurality of functions,
the interface circuitry is configured to receive a function setting signal for instructing to enable or disable the specific function to the at least one processing circuitry from the management equipment,
the control circuitry is configured to calculate a number of necessary licenses which is a number of the at least one processing circuitry enabled in case of being set based on the function setting signal, and
the control circuitry is configured to set the specific functions of the at least one processing circuitry to be enabled or disabled when the number of necessary licenses is equal to or less than the number of effective licenses.

2. The processing equipment according to claim 1, wherein the memory is configured to retain a number of times of license issuance, which is a total number of function authentication keys respectively issued to the plurality of functions, and
the control circuitry is configured to set the specific function to be enabled or disabled when a number of times of license issuance included in the received function authentication key coincides with the number of times of license issuance retained in the memory.

3. The processing equipment according to claim 1, wherein the control circuitry is configured to,
when the signal for setting the specific function to be enabled or disabled is received from the external device, confirm whether the specific function is enabled or disabled before the license request signal is created and the control circuitry creates the license request signal corresponding to a confirming result.

4. The processing equipment according to claim 1, wherein the control circuitry is configured to retain a device identifier configured to identify the processing equipment, and
when the device identifier included in the received function authentication key is configured to coincide with the retained device identifier, the control circuitry sets the specific function to be enabled or disabled according to the function authentication key.

5. The processing equipment according to claim 4, wherein the device identifier is concealed and retained.

6. The processing equipment according to claim 1, wherein the control circuitry is configured to include an encryption processing circuitry to encrypt the created license request signal before the license request signal is transmitted to the external device.

7. A remote management system comprising:
an external device;
at least one processing equipment, each of the at least one processing equipment including processing circuitry comprising a plurality of functions, a memory, interface circuitry configured to communicate with the external device, and control circuitry; and a management equipment issuing a function authentication key for setting a specific function among the plurality of functions to be enabled or disabled, wherein when the processing equipment receives a signal for setting the specific function among the plurality of functions to be enabled or disabled from the external device via the interface circuitry, the control circuitry creates a license request signal for requesting the management equipment to issue the function authentication key, and conceals the license request signal so that a content of the license request signal cannot be grasped except by the management equipment, and transmits the license request signal to the external device via the interface circuitry, the external device transfers the license request signal to the management equipment, the management equipment is configured to issue the function authentication key according to the license request signal and is configured to transmit the function authentication key to the processing equipment via the external device, and when the processing equipment receives the function authentication key issued by the management equipment from the external device, the memory retains the function authentication key and the control circuitry sets the specific function to be enabled or disabled according to the function authentication key, each of the at least one processing equipment includes the at least one of processing circuitry, each of the at least one processing circuitry has the plurality of functions, the function authentication key is configured to include a number of effective licenses which indicates a maximum number of the at least one processing circuitry of the at least one processing equipment configured to respectively enable the plurality of functions, the interface circuitry is configured to receive a function setting signal for instructing to enable or disable the specific function to the at least one processing circuitry from the management equipment, the control circuitry is configured to calculate a number of necessary licenses which is a number of the at least one processing circuitry enabled in case of being set based on the function setting signal, the control circuitry is configured to set the specific functions of the at least one processing circuitry to be enabled or disabled when the number of necessary licenses is equal to or less than the number of effective licenses, the processing equipment is configured to transmit the request signal, which includes the number of necessary licenses, to the management equipment when the number of necessary licenses is larger than the number of effective licenses, and the management equipment is configured to issue the function authentication key which includes the number of necessary licenses transmitted by the processing equipment.

8. The remote management system according to claim 7, wherein the memory is configured to retain a number of times of license issuance which is a total number of function authentication keys respectively issued to the plurality of functions, the processing equipment is configured to transmit the request signal, which includes the number of times of license issuance of the specific function retained in the memory, to the management equipment, the management equipment is configured to issue the function authentication key which includes the number of times of license issuance transmitted by the processing equipment, and the control circuitry is configured to set the specific function to be enabled or disabled when the number of times of license issuance included in the function authentication key coincides with the number of times of license issuance retained in the memory.

9. The remote management system according to claim 7, wherein an information communicated between the processing equipment and the management equipment is encrypted.

10. The remote management system according to claim 7, wherein the control circuitry is further configured to, when the processing equipment receives the signal for setting the specific function to be enabled or disabled from the external device, confirm whether the specific function is enabled or disabled before the license request signal is created and the control circuitry creates the license request signal corresponding to a confirming result.

11. The remote management system according to claim 7, wherein the processing equipment is configured to retain a device identifier configured to identify the processing equipment, and when the device identifier included in the received function authentication key is configured to coincide with the retained device identifier, the control circuitry sets the specific function to be enabled or disabled according to the function authentication key.

12. The remote management system according to claim 11, wherein the device identifier is concealed and retained.

13. The remote management system according to claim 7, wherein the control circuitry is configured to include an encryption processing circuitry to encrypt the created license request signal before the license request signal is transmitted to the external device.

* * * * *